(12) United States Patent
Morita et al.

(10) Patent No.: US 10,606,992 B2
(45) Date of Patent: Mar. 31, 2020

(54) USER AUTHENTICATION SYSTEM AND USER AUTHENTICATION APPLICATION PROGRAM

(71) Applicant: Asuha Co., Ltd., Osaka-shi, Osaka (JP)

(72) Inventors: Moriaki Morita, Osaka (JP); Shoko Nose, Osaka (JP); Takeshi Murakami, Osaka (JP)

(73) Assignee: Asuha Co., Ltd., Osaka (JP)

( * ) Notice: Subject to any disclaimer, the term of this patent is extended or adjusted under 35 U.S.C. 154(b) by 29 days.

(21) Appl. No.: 15/577,874

(22) PCT Filed: May 30, 2016

(86) PCT No.: PCT/JP2016/065936
§ 371 (c)(1),
(2) Date: Nov. 29, 2017

(87) PCT Pub. No.: WO2016/194878
PCT Pub. Date: Dec. 8, 2016

(65) Prior Publication Data
US 2018/0165433 A1    Jun. 14, 2018

(30) Foreign Application Priority Data
May 31, 2015    (JP) .................................. 2015-111005

(51) Int. Cl.
*G06F 21/00*    (2013.01)
*G06F 21/32*    (2013.01)
(Continued)

(52) U.S. Cl.
CPC .............. *G06F 21/32* (2013.01); *G06F 13/00* (2013.01); *G06F 21/34* (2013.01); *G06F 21/35* (2013.01);
(Continued)

(58) Field of Classification Search
CPC ........... G06F 21/32; G06F 21/34; G06F 13/00
(Continued)

(56) References Cited

U.S. PATENT DOCUMENTS

2007/0061590 A1\*  3/2007  Boye ..................... G06F 21/305
                                                         713/186
2015/0358307 A1\* 12/2015  Ohbitsu .................. G06F 21/31
                                                         726/5

FOREIGN PATENT DOCUMENTS

JP    2008-276633 A    11/2008
JP    2011-205502 A    10/2011
(Continued)

OTHER PUBLICATIONS

International Search Report for PCT/JP2016/065936 dated Aug. 23, 2016.

*Primary Examiner* — Anthony D Brown
(74) *Attorney, Agent, or Firm* — Hauptman Ham, LLP

(57) ABSTRACT

The user (10) uses an information terminal (200) having a user authentication application program according to the present invention installed thereon and also uses a user authentication system according to the present invention via the user authentication application program, so that it is authenticated that the user who has registered, in advance, his/her biological information (700) in at least one of the information terminal (200) and an authentication server (300) is/was present at the authentication location during the authentication reception time. Specifically, the user who has registered, in advance, his/her biological information (700) in at least one of the information terminal (200) and an authentication server (300) inputs the biological information (700) to the information terminal (200) at the authentication location during the authentication reception time, so that it is authenticated the user (10) who has registered the bio- (Continued)

logical information (700) in advance is/was present at the authentication location during the authentication reception time.

8 Claims, 25 Drawing Sheets

(51) Int. Cl.
    *G06F 21/35*     (2013.01)
    *H04M 11/00*     (2006.01)
    *G06F 21/34*     (2013.01)
    *G06F 13/00*     (2006.01)
    *G06K 9/00*     (2006.01)

(52) U.S. Cl.
    CPC ......... *G06K 9/00006* (2013.01); *H04M 11/00* (2013.01)

(58) Field of Classification Search
    USPC ............................................................ 726/7
    See application file for complete search history.

(56) References Cited

FOREIGN PATENT DOCUMENTS

| | | |
|---|---|---|
| JP | 2013-042266 A | 2/2013 |
| JP | 2014-099718 A | 5/2014 |

\* cited by examiner

US 10,606,992 B2

USER AUTHENTICATION SYSTEM AND USER AUTHENTICATION APPLICATION PROGRAM

TECHNICAL FIELD

The present invention relates to a user authentication system, a user authentication method and a user authentication application program authenticating that a user who has registered his/her biological information in advance in an information terminal or an authentication server is actually present, at a meeting location at a meeting time.

BACKGROUND ART

Conventionally, an attendance state managing device is known that authenticates a student attending a course based on a student ID code and a seat ID code transmitted from a handheld terminal, and also based on a detection result on whether or not the student is at the seat provided by a seat sensor (Patent Document 1)

CITATION LIST

Patent Literature

Patent Document 1: Japanese Laid-Open Patent Publication No. 2008-276633

SUMMARY OF INVENTION

Technical Problem

The present invention is to authenticate that a user who has registered his/her biological information in advance in an information terminal or an authentication server is actually present at a location and a time at which authentication is to be performed.

Solution to Problem

A user authentication application program according to the present invention is executable by an information terminal. The user authentication application program includes an advance authentication step including the steps of receiving, from an authentication server, a user ID number provided to a user; and receiving biological information of the user and storing the biological information on a storage portion of the information terminal; and an authentication step including the steps of transmitting, to the authentication server, the user ID number, authentication location information including information on an authentication location, and authentication time information including information on an authentication time; receiving one of a first ID number and a second ID number included in a beacon signal output at the authentication location at the authentication time; selecting a beacon signal based on the one of the first ID number and the second ID number during an authentication reception time; extracting the other of the first ID number and the second ID number from the selected beacon signal; receiving biological information of the user from outside the information terminal; comparing the biological information stored on the storage portion and the received biological information; and transmitting, to the authentication server, the other of the first ID number and the second ID number, the user ID number, and a biological authentication result.

A user authentication system according to the present invention, which: transmits a user ID number to an information terminal; receives, from the information terminal, the user ID number, authentication location information including information on an authentication location, and authentication time information including information on an authentication time; transmits, to the information terminal, one of a first ID number and a second ID number included in a beacon signal output at the authentication location at the authentication time; correlates the other of the first ID number and the second ID number to the user ID number and, stores the other of the first ID number and the second ID number in the correlated state on a storage portion; receives the other of a first ID number and a second ID number, the user ID number, and a biological authentication result; compares the other of the first ID number and the second ID number, and the other of the first ID number and the second ID number stored on the storage portion and corresponding to the received user ID number, against each other; and generates a comprehensive authentication result based on a result of the comparison and the biological authentication result.

A user authentication application program according to the present invention is executable by an information terminal. The user authentication application program includes an advance authentication step including the steps of: receiving, from an authentication server, a user ID number provided to a user; and receiving biological information of the user and transmitting the biological information to the authentication server together with the user ID number; and an authentication step including the steps of: transmitting, to the authentication server, the user ID number, authentication location information including information on an authentication location, and authentication time information including information on an authentication time; receiving one of a first ID number and a second ID number included in a beacon signal output at the authentication location at the authentication time; selecting a beacon signal based on the one of the first ID number and the second ID number during an authentication reception time; extracting the other of the first ID number and the second ID number from the selected beacon signal; receiving the biological information of the user during the authentication reception time and transmitting the biological information to the authentication server together with the user ID number; and transmitting, to the authentication server, the other of the first ID number and the second ID number, and the user ID number.

A user authentication system according to the present invention, which: transmits a user ID number to an information terminal; receives the user ID number and biological information from the information terminal, correlates the biological information to the user ID number, and stores the biological information in the correlated state on a storage portion; receives, from the information terminal, authentication location information including information on an authentication location and authentication time information including information on an authentication time; transmits, to the information terminal, one of a first ID number and a second ID number included in a beacon signal output at the authentication location at the authentication time; correlates the other of the first ID number and the second ID number to the user ID number and stores the other of the first ID number and the second ID number in the correlated state on the storage portion; receives the other of a first ID number and a second ID number, the user ID number, and biological information during an authentication reception time; compares the other of the first ID number and the second ID number, and the other of the first ID number and the second ID number stored on the storage portion and corresponding to the received user ID number, against each other; compares the biological information received during the authentication reception time, and the biological information stored on the storage portion and corresponding to the received user ID number, against each other; and generates a comprehensive authentication result based on results of the two comparisons.

A user authentication application program according to the present invention is executable by an information terminal. The user authentication application program includes an advance authentication step including the steps of: receiving, from an authentication server, a user ID number provided to a user; and receiving biological information of the user and storing the biological information on a storage portion of the information terminal; and an authentication step including the steps of: receiving, from the authentication server, authentication location information including information on an authentication location and authentication time information including information on an authentication time; receiving one of a first ID number and a second ID number included in a beacon signal output at the authentication location at the authentication time; selecting a beacon signal based on the one of the first ID number and the second ID number during an authentication reception time; extracting the other of the first ID number and the second ID number from the selected beacon signal; receiving biological information of the user from outside the information terminal; comparing the biological information stored on the storage portion and the received biological information against each other; and transmitting, to the authentication server, the other of the first ID number and the second ID number, the user ID number, and a biological authentication result.

A user authentication system according to the present invention, which: transmits a user ID number to an information terminal; transmits, to the information terminal, authentication location information including information on an authentication location and authentication time information including information on an authentication time; transmits, to the information terminal, one of a first ID number and a second ID number included in a beacon signal output at the authentication location at the authentication time; correlates the other of the first ID number and the second ID number to the user ID number and stores the other of the first ID number and the second ID number in the correlated state on a storage portion; receives the other of a first ID number and a second ID number, the user ID number, and a biological authentication result; compares the other of the first ID number and the second ID number, and the other of the first ID number and the second ID number stored on the storage portion and corresponding to the received user ID number, against each other; and generates a comprehensive authentication result based on a result of the comparison and the biological authentication result.

A user authentication application program according to the present invention is executable by an information terminal. The user authentication application program includes an advance authentication step including the steps of: receiving, from an authentication server, a user ID number provided to a user; and receiving biological information of the user and transmitting the biological information to the authentication server together with the user ID number; and an authentication step including the steps of: receiving, from the authentication server, the user ID number, authentication location information including information on an authentication location, and authentication time information including information on an authentication time; receiving one of a first ID number and a second ID number included in a beacon signal output at the authentication location at the authentication time; selecting a beacon signal based on the one of the first ID number and the second ID number during an authentication reception time; extracting the other of the first ID number and the second ID number from the selected beacon signal; receiving the biological information of the user during the authentication reception time and transmitting the biological information to the authentication server together with the user ID number; and transmitting, to the authentication server, the other of the first ID number and the second ID number, and the user ID number.

A user authentication system according to the present invention, which: transmits a user ID number to an information terminal; receives, from the information terminal, the User ID number and biological information, correlates the biological information to the user ID number, and stores the biological information in the correlated state on a storage portion; transmits, to the information terminal, authentication location information including information on an authentication location and authentication time information including information on an authentication time; transmits one of a first ID number and a second ID number included in a beacon signal output at the authentication location at the authentication time; correlates the other of the first ID number and the second ID number to the user ID number and stores the other of the first ID number and the second ID number in the correlated state on the storage portion; receives the other of a first ID number and a second ID number, the user ID number, and biological information during an authentication reception time; compares the other of the first ID number and the second ID number, the other of the first ID number and the second ID number stored on the storage portion and corresponding to the received user ID number, against each other; compares the biological information received during the authentication reception time, and the biological information stored on the storage portion and corresponding to the received user ID number, against each other; and generates a comprehensive authentication result based on results of the two comparisons.

A user authentication application program according to the present invention is executable by an information terminal. The user authentication application program includes an advance authentication step including the steps of receiving biological information of a user and storing the biological information on a storage portion of the information terminal; receiving personal information of the user and transmitting the personal information to an authentication server; and receiving a user ID number provided to the user from the authentication server; and an authentication step including the steps of: receiving authentication location information including information on an authentication location and authentication time information including information on an authentication time; transmitting the user ID number, the authentication location information and authentication time information to the authentication server; receiving a first ID number included in a beacon signal output at the authentication location at the authentication time; receiving the beacon signal having the first ID number and confirming a second ID number of the beacon signal; receiving biological information of the user from outside the information terminal; comparing the biological information stored on the storage portion and the received biological information; transmitting the user ID number, the first ID number, the second ID number, and a biological authentication result to the authentication server; and receiving a comprehensive authentication result from the authentication server.

In a user authentication system according to the present invention; an authentication server receives personal information from an information terminal; the authentication server generates a user ID number corresponding to the personal information; the authentication server correlates the user ID number with the personal information and storing them; the authentication server transmits the user ID number to the information terminal; the authentication server receives authentication location information, authentication time information, and the user ID number from the information terminal; the authentication server acquires a first ID number and a second ID number corresponding to authentication location information and authentication time information; the authentication server stores a pair of the first ID number and the second ID number; the authentication server transmits the first ID number to the information terminal before authentication reception time; the authentication server receives a user ID number, a first ID number, a second ID number, and a biological authentication result from the information terminal; the authentication server retrieves pair of the first ID number and second ID number from a storage portion of the authentication server; the authentication server compares the pair of the first ID number and the second ID number received from the information terminal, and the pair of the first ID number and the second ID number retrieved; and the authentication server transmitted the comprehensive authentication result to the information terminal.

A user authentication application program according to the present invention is executable by an information terminal. The user authentication application program includes an advance authentication step including the steps of receiving biological information of a user and transmitting the biological information to an authentication server; and receiving personal information of the user and transmitting the personal information; and receiving a user ID number provided to the user from the authentication server; and an authentication step including the steps of: transmitting authentication location information including information on an authentication location and authentication time information including information on an authentication time to the authentication server; transmitting the user ID number, the authentication location information, and the authentication time information to the authentication server; receiving a first ID number included in a beacon signal output at the authentication location at the authentication time; receiving the beacon signal having the first ID number and confirming a second ID number of the beacon signal; receiving biological information of the user from outside the information terminal; transmitting the user ID number, the first ID number, the second ID number, and the biological information to the authentication server; and receiving a comprehensive authentication result from the authentication server.

In a user authentication system according to the present invention; an authentication server receives personal information and biological information from an information terminal; the authentication server generates a user ID number corresponding to the personal information; the authentication server correlates the user ID number with the personal information and the biological information, and storing them; the authentication server transmits the user ID number to the information terminal; the authentication server receives authentication location information, authentication time information, and the user ID number from the information terminal; the authentication server acquires a first ID number and a second ID number corresponding to authentication location information and authentication time information; the authentication server stores a pair of the first ID number and the second ID number; the authentication server transmits the first ID number to the information terminal before authentication reception time; the authentication server receives a user ID number, a first ID number, a second ID number, and biological information from the information terminal; the authentication server retrieves pair of the first ID number and second ID number from a storage portion of the authentication server; the authentication server compares the pair of the first ID number and the second ID number received from the information terminal, and the pair of the first ID number and the second ID number retrieved; the authentication server compares the biological information stored on the storage portion and the received biological information; and the authentication server transmitted the comprehensive authentication result to the information terminal.

A user authentication application program according to the present invention is executable by an information terminal. The user authentication application program includes an advance authentication step including the steps of receiving biological information of a user, storing the biological information on a storage portion of the information terminal, and transmitting the biological information to an authentication server; receiving personal information of the user and transmitting the personal information to an authentication server; and receiving a user ID number provided to the user from the authentication server; and an authentication step including the steps of: receiving authentication location information including information on an authentication location and authentication time information including information on an authentication time; transmitting the user ID number, the authentication location information and the authentication time information to the authentication server; receiving a first ID number included in a beacon signal output at the authentication location at the authentication time; receiving the beacon signal having the first ID number and confirming a second ID number of the beacon signal; receiving biological information of the user from outside the information terminal and transmitting the biological information to the authentication server; comparing the biological information stored on the storage portion and the received biological information; transmitting the user ID number, the first ID number, the second ID number, and a biological authentication result to the authentication server; and receiving a comprehensive authentication result from the authentication server.

In a user authentication system according to the present invention; an authentication server receives personal information and biological information from an information terminal; the authentication server generates a user ID number corresponding to the personal information; the authentication server correlates the user ID number with the personal information and the personal information, and storing them; the authentication server transmits the user ID number to the information terminal; the authentication server receives authentication location information, authentication time information, and the user ID number from the information terminal; the authentication server acquires a first ID number and a second ID number corresponding to authentication location information and authentication time information; the authentication server stores a pair of the first ID number and the second ID number; the authentication server transmits the first ID number to the information terminal before authentication reception time; the authentication server receives a user ID number, a first ID number, a second ID number, biological information, and a biological authentication result from the information terminal; the authentication server retrieves pair of the first ID number and second ID number from a storage portion of the authentication server; the authentication server compares the pair of the first ID number and the second ID number received from the information terminal, and the pair of the first ID number and the second ID number retrieved; the authentication server compares the biological information stored on the storage portion and the received biological information; and the authentication server transmitted the comprehensive authentication result to the information terminal.

In an embodiment of the present invention, the user authentication application program includes the steps of: transmitting a third ID number regarding the information terminal to the authentication server; and transmitting, during the authentication reception time, a beacon signal including the one of the first ID number and the second ID number and the third ID number.

In an embodiment of the present invention, before the one of the first ID number and the second ID number is transmitted to the information terminal, the one of the first ID number and the second ID number is stored on the storage portion; and before the other of the first ID number and the second ID number is stored on the storage portion, the other of the first ID number and the second ID number transmitted from another information terminal is received.

Advantageous Effects of Invention

A user authentication application program according to the present invention may be downloaded from the web or the like and installed on an information terminal by the user. The information terminal receives a user ID provided to the user, from an authentication server in a user authentication system according to the present invention. The information terminal receives and stores biological information of the user, and thus an advance registration of the biological information is performed.

The information terminal transmits authentication location information and authentication time information to the authentication server. The information terminal may transmit the authentication location information or the authentication time information to the authentication server. In the case where the authentication location is determined in advance, the authentication location may be set as default in the authentication server in advance. In the case where the authentication time is determined in advance, the authentication time may be set as default in the authentication server in advance.

Instead of the information terminal transmitting the authentication location information and the authentication time information to the authentication server, the authentication server may transmit the authentication location information and the authentication time information to the information terminal. In the case where the authentication location is determined in advance, the authentication location may be set as default in the authentication server in advance. In the case where the authentication time is determined in advance, the authentication time may be set as default in the authentication server in advance.

In the case where, for example, one of a plurality of users is a leader, the leader may use the information terminal to transmit the authentication location information and the authentication time information to the authentication server.

Then, the authentication server may transmit the authentication location information and the authentication time information to information terminals of the plurality of users (encompassing a case where the leader is included, and a case where the leader is not included).

The authentication server transmits one of a first ID number and a second ID number, included in a beacon signal output at the authentication location at the authentication time, to the information terminal, and stores the other of the first ID number and the second ID number on a storage portion thereof.

The information terminal selects a beacon signal based on the one of the first ID number and the second ID numbers and extracts the other of the first ID number and the second ID number from the selected beacon signal.

Upon receipt of the selected beacon signal or while receiving the selected beacon signal, the information terminal receives biological information of the user from outside.

The information terminal compares the biological information registered in advance and the received biological information.

The information terminal transmits the other of the first ID number and the second ID number, the user ID number, and a biological authentication result to the authentication server.

The authentication server receives the other of the first ID number and the second ID number, the user ID number, and the biological authentication result.

The authentication server compares the other of the received first ID number and the received second ID number, and the other of a first ID number and a second ID number corresponding to the received user ID number.

The authentication server generates a comprehensive authentication result based on the result of the comparison and the biological authentication result.

As a result, it is authenticated that the user who has made the biological information in advance is/was present at an authentication location during an authentication reception time.

A user authentication application program according to the present invention may be downloaded from the web or the like and installed on an information terminal by the user. The information terminal receives a user ID provided to the user, from an authentication server in a user authentication system according to the present invention. The information terminal receives biological information of the user and transmits the biological information to the authentication server. The authentication server stores the biological information on a storage portion thereof, and thus an advance registration of the biological information is performed.

The information terminal transmits authentication location information and authentication time information to the authentication server. The information terminal may transmit the authentication location information or the authentication time information to the authentication server. In the case where the authentication location is determined in advance, the authentication location may be set as default in the authentication server in advance. In the case where the authentication time is determined in advance, the authentication time may be set as default in the authentication server in advance.

Instead of the information terminal transmitting the authentication location information and the authentication time information to the authentication server, the authentication server may transmit the authentication location information and the authentication time information to the information terminal. In the case where the authentication location is determined in advance, the authentication location may be set as default in the authentication server in advance. In the case where the authentication time is determined in advance, the authentication time may be set as default in the authentication server in advance.

In the case where, for example, one of a plurality of users is a leader, the leader may use the information terminal to transmit the authentication location information and the authentication time information to the authentication server. Then, the authentication server may transmit the authentication location information and the authentication time information to information terminals of the plurality of users (encompassing a case where the leader is included, and a case where the leader is not included).

The authentication server transmits one of a first ID number and a second ID number, included in a beacon signal output at the authentication location at the authentication time, to the information terminal, and stores the other of the first ID number and the second ID number on a storage portion thereof.

The information terminal selects a beacon signal based on the one of the first ID number and the second ID number, and extracts the other of the first ID number and the second ID number from the selected beacon signal.

The information terminal receives biological information of the user from outside, and transmits the received biological information, the user ID number, and the other of the extracted first ID number and the extracted second ID number to the authentication server.

The authentication server compares the biological information registered in advance and the received biological information.

The authentication server compares the other of the received first ID number and the received second ID number, and the other of a first ID number and a second ID number corresponding to the received user ID number.

The authentication server generates a comprehensive authentication result based on a location authentication result and a biological authentication result.

As a result, it is authenticated that the user who has made the biological information in advance is/was present at an authentication location during an authentication reception time.

A user authentication application program according to the present invention may be downloaded from the web or the like and installed on an information terminal by user A. Similarly, the user authentication application program according to the present invention may be downloaded from the web or the like and installed on another information terminal by user B.

The information terminal may transmit a beacon signal including a first ID number and a third ID number during an authentication reception time. The another information terminal may transmit a beacon signal including the first ID number and a second ID number during the authentication reception time. The information terminal may transmit the third ID number to the authentication server before the authentication reception time. The another information terminal may transmit the second ID number to the authentication server before the authentication reception time.

The information terminal specifies a beacon signal based on the first ID number during the authentication reception time, extracts the ID number included in the beacon signal, and transmits the ID number, and at least one of a biological authentication result on user A and biological information of user A while a beacon signal is being received or when a beacon signal is received from the another information terminal, to an authentication server in a user authentication system according to the present invention.

The another information terminal specifies a beacon signal based on the first ID number during the authentication reception time, extracts the ID number included in the beacon signal, and transmits the ID number, and at least one of a biological authentication result on user B and biological information of user B while a beacon signal is being received or when a beacon signal is received from the information terminal, to the authentication server in the user authentication system according to the present invention.

The authentication server in the user authentication according to the present invention compares the ID number transmitted from the information terminal and the second ID number transmitted from the another information terminal. The authentication server in the user authentication according to the present invention compares the ID number transmitted from the another information terminal and the third ID number transmitted from the information terminal.

The authentication server in the user authentication system according to the present invention may authenticate that user A, who has registered the biological information in advance, is/was present at the authentication location during the authentication reception time, based the second ID number and at least one of the comparison result, the biological authentication result on user A and the biological information of user A.

The authentication server in the user authentication system according to the present invention may authenticate that user B, who has registered the biological information in advance, is/was present at the authentication location during the authentication reception time, based the third ID number and at least one of the comparison result, the biological authentication result on user B and the biological information of user B.

BRIEF DESCRIPTION OF DRAWINGS

FIG. 3(c) is a flowchart showing an example of user authentication application program in performing biological authentication and the like.

FIG. 9(*b*) is a flowchart showing an example of user authentication application program in which the user acquires the meeting time and the meeting location. FIG. 9(*c*) is a flowchart showing an example of user authentication application program in performing biological authentication and the like.

DESCRIPTION OF EMBODIMENTS

Hereinafter, a user authentication system, a user authentication method and a user authentication program according to the present invention will be described with reference to the drawings.

Figure 1:
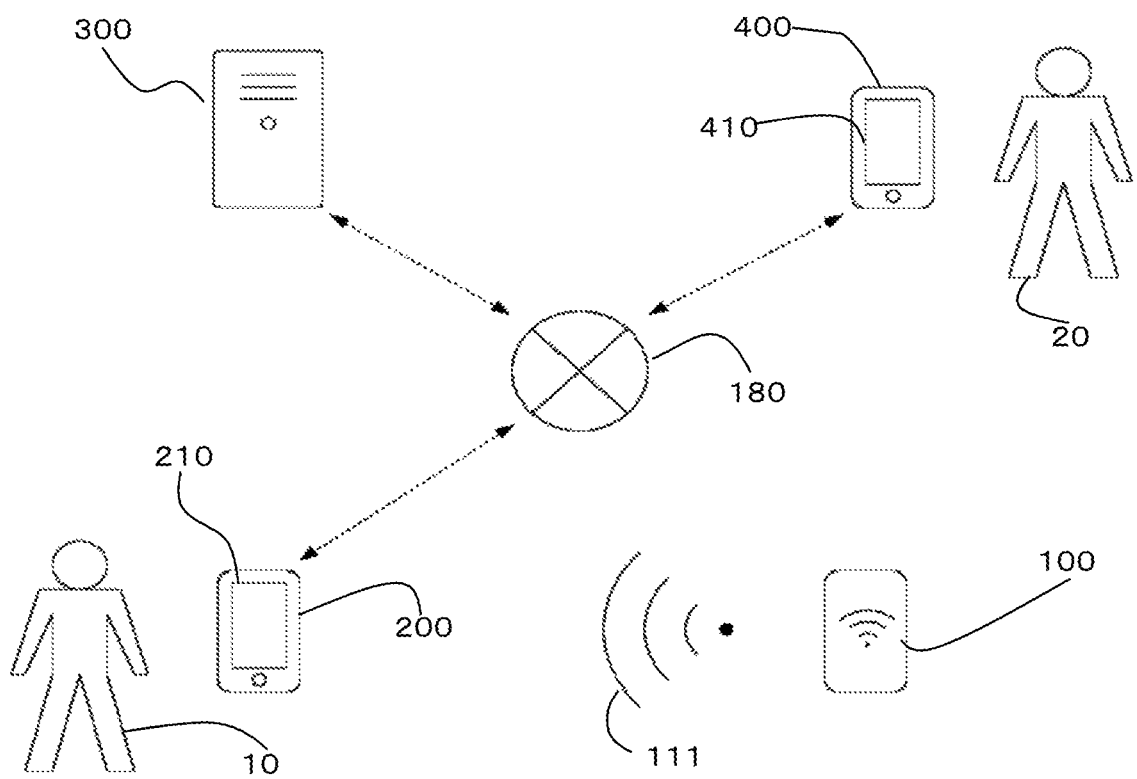
FIG. 1 shows a user authentication method in embodiment 1 according to the present invention.

FIG. 1 shows a user authentication method in embodiment 1 according to the present invention.

A user 10 activates the user authentication program in an information terminal 200 and registers his/her biological information in the information terminal 200. The "biological information" includes at least one of fingerprint information, face information, vein information, handshape information, handprint information, retina information, iris information, voiceprint information, and handwriting information.

Figure 2A:
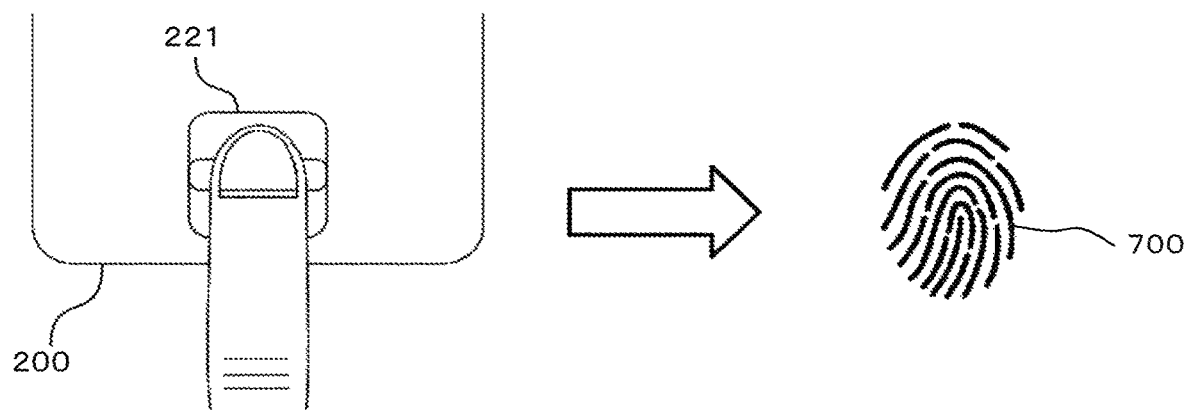
FIG. 2(a) shows how fingerprint information is input to the information terminal 200.
Figure 2B:
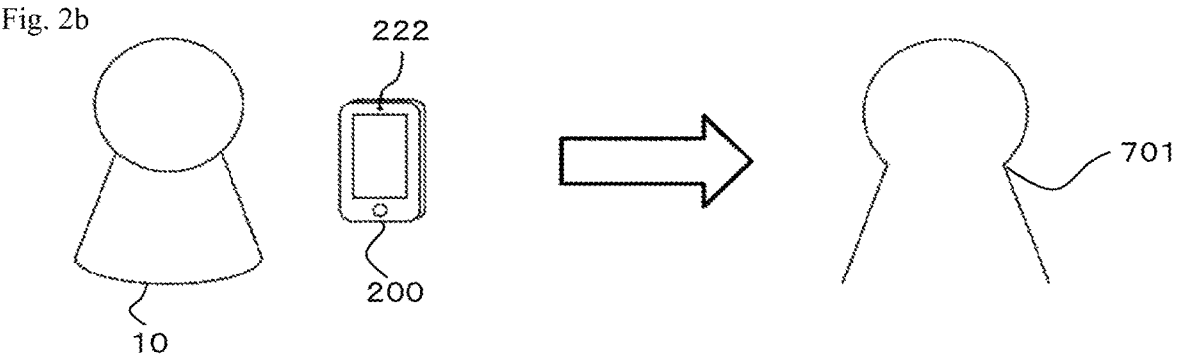
FIG. 2(b) shows how the face information is input to the information terminal 200.

FIG. 2(*a*) shows how fingerprint information is input to the Information terminal 200. The user 10 may cause a fingerprint sensor included in the information terminal 200 to scan the fingerprint of his/her finger(s) to input fingerprint information 700, which is one type of biological information, to the information terminal 200.

FIG. 2(*b*) shows how the face information is input to the information terminal 200. The user 10 may take a picture of his/her face with a camera included in the information terminal 200 to input face information 701, which is one type of biological information, to the information terminal 200.

The user 10 may use a touch panel and/or keys of a display portion 210 included in the information terminal 200 to input his/her personal information to the information terminal 200. The "personal information" includes at least one of his/her name, birth date, address, phone number and mail address.

The biological information of the user is stored on a storage portion of the information terminal 200, and the personal information of the user is transmitted to an authentication server 300 via a communication line 180. The information terminal 200 and the authentication server 300 may exchange information via the communication line 180.

When the personal information is transmitted to the authentication server 300, the authentication server 300 generates a user ID number corresponding to the personal information. The authentication server 300 correlates the user ID number and the personal information to each other and stores the user ID number and the personal information on a storage portion of the authentication server 300 in the correlated state.

The authentication server 300 transmits the user ID number to the information terminal 200. Upon receipt of the user ID number, the information terminal 200 stores the user ID number on the storage portion of the information terminal 200.

After the information terminal 200 receives the user ID number, the user 10 may operate the information terminal 200, while the user authentication application program is still active, to transmit, to the authentication server 300, information on an authentication location and an authentication time at which user authentication is to be performed. In other words, upon receipt of such authentication location information and such authentication time information from the touch panel or the keys, the information terminal 200 transmits the authentication location information and the authentication time information to the authentication server 300 together with the user ID number.

Upon receipt of the authentication location, the authentication time and the user ID number, the authentication server 300 may retrieve, from the storage portion of the authentication server 300, a first ID number and a second ID number included in a beacon signal that is output from an output device 100 corresponding to the authentication location information and the authentication time information. The authentication server 300 may store the first ID number and the second ID number on the storage portion in association with the user ID number. The first ID number and the second ID number may be stored on the storage portion in association with each other. In this case, the first ID number and the second ID number corresponding to the authentication location and the authentication time are already stored on the authentication server 300.

The first ID number and the second ID number may be input from outside the authentication server 300 by an operator 20, instead of being retrieved from the storage portion. In this case, upon receipt of the authentication location information, the authentication time information and the user ID number, the authentication server 300 transmits the authentication location information and the authentication time information to an information terminal 400 of the operator 20 via the communication line 180. The information terminal 400 and the authentication server 300 may exchange information via the communication line 180. Upon receipt of the authentication location information and the authentication time information, the information terminal 400 outputs an alert. The alert may be at least one of a sound such as chimes, voice or the like output by the information terminal 400 and a vibration of the information terminal 400.

After sensing the alert, the operator 20 operates the information terminal 400 to cause a display portion 410 of the information terminal 400 to display the authentication location and the authentication time. The operator 20 operates the information terminal 400 to transmit, to the authentication server 300, the first ID number included in a beacon signal output by the output device 100 that is to be used at the authentication location at the authentication time. When outputting the alert, the information terminal 400 may display the authentication location and the authentication time on the display portion. The information terminal 400 may display, on the display portion displaying the authentication location and the authentication time, an input portion usable to input the first ID number and the second ID number, and recognize the numbers input by touch input or key input as the first ID number and the second ID number.

The operator 20 sets the output device 100 at the authentication location such that the output device 100 outputs a beacon signal before an authentication reception time. The "authentication reception time" has a range of +α time and −β time with respect to the authentication time.

Before the authentication reception time, the authentication server 300 transmits, to the information terminal 200, the first ID number included in the beacon signal output from the output device. The information terminal 200 stores the first ID number on the storage portion of the information terminal 200.

During the authentication reception time, the user 10 brings the information terminal 200 to the authentication location at which the user authentication is to be performed. The information terminal 200 has been put, by a user authentication application program or a function of the information terminal 200, into a state of being capable of receiving a beacon signal 111 during the authentication reception time. Upon receipt of the beacon signal 111 including the first ID number, the information terminal 200 confirms the second ID number included in the beacon signal 111.

When the information terminal 200 confirms the second ID number, the information terminal 200 alerts the user. This alert may be one of a sound such as chimes, voice or the like output by the information terminal 200 and a vibration of the information terminal 200. The information terminal 200 displays, on the display portion 210, an instruction instructing the user to perform biological authentication.

The user 10 may voluntarily cause the information terminal 200 to perform the biological authentication. In this case, the user may follow the instruction displayed on the display portion 210 to cause the information terminal 200 to recognize the biological information of the user.

Upon recognizing the biological information of the user, the information terminal 200 compares the recognized biological information, and the biological information stored on the storage portion of the information terminal 200. When determining that the two pieces of biological information match each other, the information terminal 200 transmits, to the authentication server 300, the user ID number, the first ID number, the second ID number, and a biological authentication result obtained as a result of the comparison. When determining that the recognized biological information does not match the biological information stored on the storage portion, the information terminal 200 may display, on the display portion 210 of the information terminal 200, a message that the authentication is not successfully made. When determining that the recognized biological information does not match the biological information stored on the storage portion, the information terminal 200 may transmit the user ID number, the first ID number, the second ID number, and the biological authentication result obtained as a result of the comparison, to the authentication server 300.

Upon receipt of the user ID number, the first ID number, and the second ID number from the information terminal 200, the authentication server 300 compares the pair of the first ID number and the second ID number stored on the storage portion thereof, and the pair of the first ID number and the second ID number transmitted from the information terminal 200, to perform location authentication.

When determining that the pair of the first ID number and the second ID number stored on the storage portion match the pair of the first ID number and the second ID number transmitted from the information terminal 200, the authentication server 300 correlates at least one of the first ID number, the second ID number, the authentication date at which the authentication server 300 made such a determination, the biological authentication result, a location authentication result, and a comprehensive authentication result in the authentication server 300 to the user ID number, and stores such information in the correlated state on the storage portion of the authentication server 300. The "comprehensive authentication result" indicates whether both of the biological authentication and the location authentication are successfully made.

Alternatively, the authentication server 300 may transmit one of the first ID number and the second ID number to the information terminal 200, the information terminal 200 may recognize the other of the first ID number and the second ID number from the beacon signal based on the ID number transmitted from the authentication server 300, the information terminal 200 may transmit the other ID number to the authentication server 300, and the authentication server 300 may determine whether or not the other ID number received matches the other of the first ID number and the second ID number stored on the storage portion on the authentication server 300.

The authentication server 300 transmits the comprehensive authentication result in the authentication server 300 to the information terminal 200.

Upon receipt of the comprehensive authentication result, the information terminal 200 may display the comprehensive authentication result in the authentication server 300 on the display portion 210. Upon receipt of the comprehensive authentication result, the information terminal 200 may output at least one of a sound such as chimes, voice or the like and a vibration.

The authentication server 300 may transmit, to the information terminal 400 of the operator 20, at least one of the user ID number, the authentication date at which the authentication server 300 made the above-described determination, the biological authentication result, the location authentication result in the authentication server 300, and the comprehensive authentication result in the authentication server 300.

FIG. 3 is a flowchart showing an example of user authentication application program in embodiment 1 according to the present invention.

The information terminal 200 has the user authentication application program installed thereon. The user authentication application program may be downloaded from an Internet site of a producer of the information terminal 200 or the authentication server 300 and installed. Alternatively, the user authentication application program may be installed on the information terminal 200 via an external storage device of the information terminal 200.

Hereinafter, an example of advance registration performed before the user authentication will be described with reference to FIG. 3(a).

The user 10 operates the information terminal 200 to activate the user authentication application program (step S10). The user authentication application program causes the display portion 210 of the information terminal 200 to display an instruction instructing the user 10 to input his/her biological information. When the user 10 inputs the biological information to the information terminal 200, the user authentication application program causes the information terminal 200 to store the input biological information thereon (step S30).

The user authentication application program causes the display portion 210 of the information terminal 200 to display an instruction instructing the user 10 to input his/her personal information. When the user 10 inputs the personal information to the information terminal 200, the information terminal 200 transmits the input personal information to the authentication server 300 (step S50).

The user authentication application program causes the information terminal 200 to receive the user ID number transmitted from the authentication server 300 and to store the user ID number on the storage portion of the information terminal 200 (step S70).

The information terminal 200 performs, step S10 through step S70, and thus the advance registration before the user authentication is finished. Step S30 and step S50 may be performed in an opposite order.

Hereinafter, an example of steps in which the user acquires a meeting location and a meeting time will be described with reference to FIG. 3(b). Before the user acquires the meeting location and the meeting time, the above-described advance registration is performed.

The user 10 operates the information terminal 200 to activate the user authentication application program (step S100). The user authentication application program causes the display portion 210 of the information terminal 200 to display an instruction instructing the user 10 to input the authentication location and the authentication time. When the user 10 inputs the authentication location and the authentication time to the information terminal 200, the user authentication application program causes the information terminal 200 to receive the authentication location information and the authentication time information (step S120).

The user 10 may input the authentication location and the authentication time by selecting the authentication location and the authentication time displayed on the display portion 210 of the information terminal 200, or may directly input numerical values and letters by use of the touch panel or the keys of the information terminal 200. In the case where the user 10 selects the authentication location and the authentication time, the user authentication application program may instruct the information terminal 200 to receive the authentication location information and the authentication time information from the authentication server 300.

After the authentication location information and the authentication time information input by the user 10 are received, the user authentication application program instructs the information terminal 200 to transmit, to the authentication server 300, the user ID number, the authentication location information and the authentication time information stored on the storage portion of the information terminal 200 (step S140).

The user authentication application program causes the information terminal 200 to receive the first ID number transmitted to the authentication server 300 and to store the first ID number on the storage portion of the information terminal 200 (step S160).

Hereinafter, an example of user authentication performed by the information terminal 200 will be described with reference to FIG. 3(c).

After causing the information terminal 200 to receive the first ID number and during, or before, the authentication reception time, the user authentication application program causes the information terminal 200 to be capable of receiving a beacon signal, to receive a beacon signal including the first ID number, and to confirm the second ID number included in the beacon signal (step S180).

After causing the information terminal 200 to confirm the second ID number the user authentication application programs causes the display portion 210 of the information terminal 200 to display an instruction instructing the user 10 to perform the biological authentication (step S200).

When the display portion 210 of the information terminal 200 displays the instruction instructing the user 10 to input his/her biological information and the user 10 inputs the biological information to the information terminal 200, the user authentication application program causes the information terminal 200 to recognize the input biological information (Step S220).

The user 10 may voluntarily input the biological information to the information terminal 200. In this case, if the information, included in the beacon signal, to be confirmed, for example, the second ID number, is not confirmed, the procedure does not advance to step S240.

The user authentication application program compares the recognized biological information and the biological information stored on the storage portion of the information terminal 200, and causes the information terminal 200 to determine whether the two pieces of biological information match each other (step S240).

In the case where the two pieces of biological information match each other, the user authentication application program causes the information terminal 200 to transmit the user ID number, the first ID number, the second ID number, and the biological authentication result to the authentication server 300 (step S260). In the case where the two pieces of biological information do not match each other, the user authentication application program may cause the information terminal 200 to perform step S220 and step S240 a predetermined number of times. Needless to say, a set of the user ID number and the first ID number, a set of the user ID number and the second ID number, and a set of the user ID number and the biological authentication result may be transmitted separately.

In the case where the two pieces of biological information do not match each other even after step S220 and step S240 are performed the predetermined number of times, the user authentication application program may cause the display portion 210 of the information terminal 200 to display a message that the two pieces of biological information do not match each other or the authentication is not successfully made.

In the case where the two pieces of biological information do not match each other even after step S220 and step S240 are performed the predetermined number of times, the user authentication application program may cause the information terminal 200 to transmit, to the authentication server 300, the user ID number, the first ID number, the second ID number, and the biological authentication result.

The user authentication application program causes the information terminal 200 to receive the authentication result from the authentication server 300 (step S280), and causes the display portion 210 of the information terminal 200 to display the authentication result (step S300).

Figure 4:
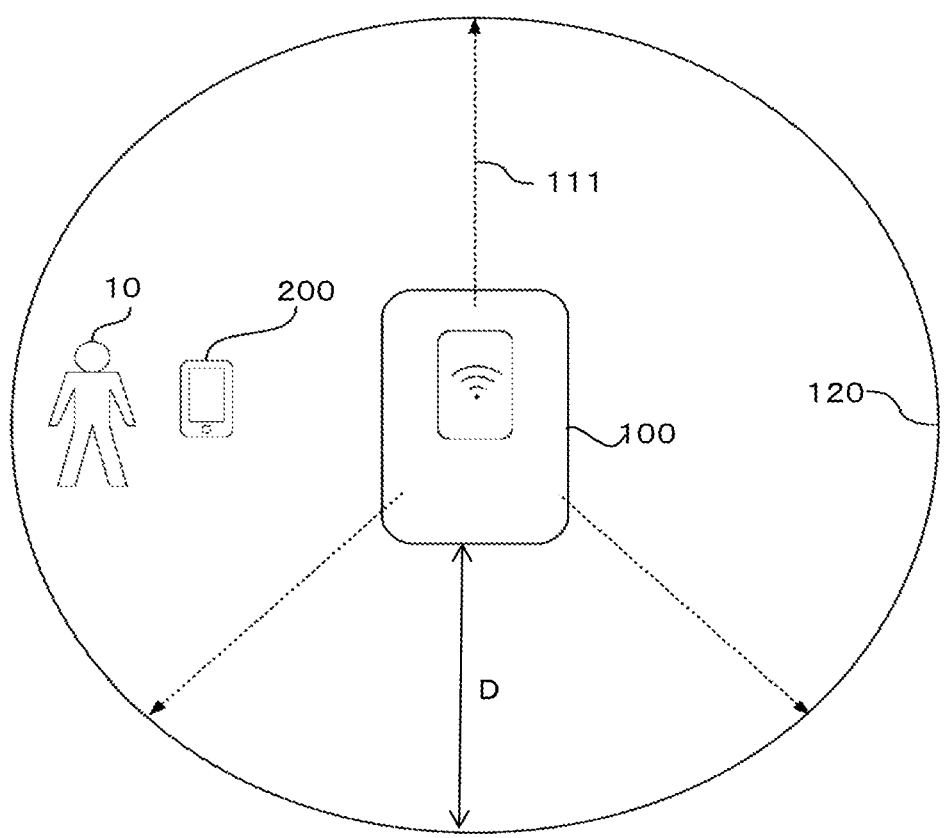
FIG. 4 is a figure showing that the information terminal 200 is located within a range having a distance D from the output device 100.
Figure 5:
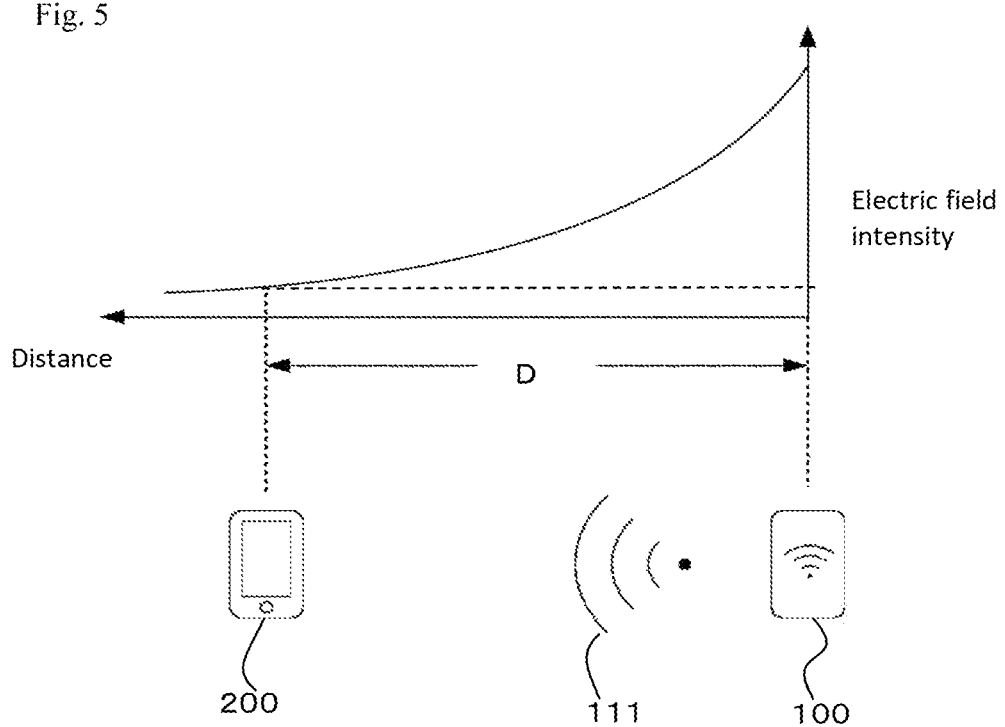
FIG. 5 is a graph showing the relationship between the distance from the output device 100 and the electric field intensity of the beacon signal 111 at the distance.

As shown in FIG. 4, the confirmation in step S180 may be performed when the information terminal 200 is located within a range having a distance D from the output device 100. FIG. 5 is a graph showing the relationship between the distance from the output device 100 and the electric field intensity of the beacon signal 111 at the distance. Where the electric field intensity is E when the distance from the output device 100 is D, the user authentication application program may cause the information terminal 200 to confirm the first ID number in the received beacon signal when the electric field intensity of the beacon signal 111 is E or greater.

The determination in step S240 may be performed as follows. The recognized biological information and the biological information stored on the storage portion of the information terminal 200 are sampled, and a total value of matching points out of the sampling points is found. In the case where the total value is higher than, or equal to, a threshold value X, the user authentication application program may determine that the two pieces of biological information match each other. In the case where the total value is lower than the threshold value X, the user authentication application program may determine that the two pieces of biological information do not match each other.

Figure 6:
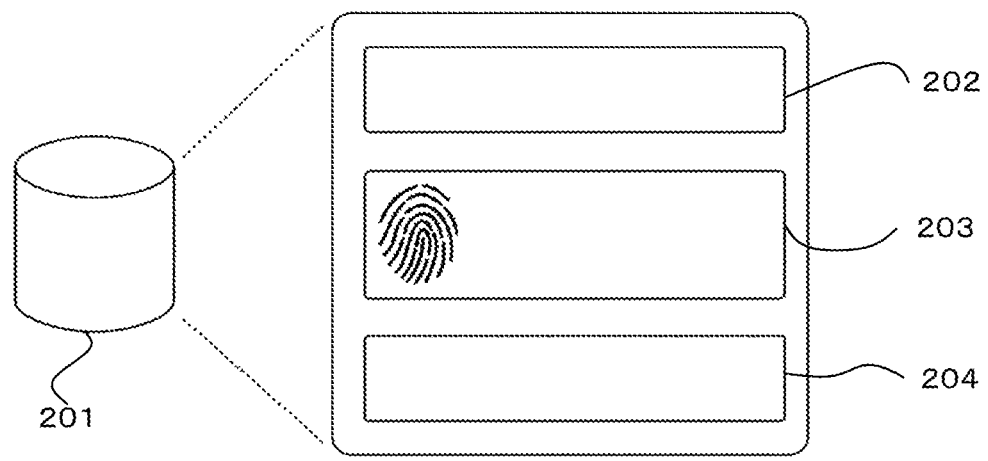
FIG. 6 is a figure showing an example of storage portion of information terminal 200.

As shown in FIG. 6, the storage portion 201 of information terminal 200 may include a user ID number storage portion 202 storing the user ID number, a biological information storage portion 203 storing the biological information, and an ID information storage portion 204 storing ID information on the beacon signal.

FIG. 7 is a flowchart showing an example of user authentication system in embodiment 1 according to the present invention. The user authentication system may perform the user authentication while exchanging information with the information terminal 200 having the above-described user authentication application program installed thereon.

Hereinafter, an example of advance registration performed before the user authentication will be described with reference to FIG. 7(a).

Upon receipt of the personal information from the information terminal 200 (step S410), the authentication server 300 generates a user ID number corresponding to the personal information (step S430). The authentication server 300 correlates the user ID number and the corresponding personal information to each other, and stores the user ID number and the corresponding personal information in the correlated state on the storage portion of the authentication server 300 (step S450). The authentication server 300 transmits the user ID number to the information terminal 200 (step S470). Step S450 and step S470 may be performed in an opposite order.

Hereinafter, an example of handling of the authentication location information, the authentication time information, the first ID number and the second ID number by the authentication server 300 will be described with reference to FIG. 7(b). Before the handling, the above-described advance registration is performed by the information terminal 200.

The authentication server 300 receives, from the information terminal 200, the authentication location information, the authentication time information, and the user ID number (step S500). Before receiving the authentication location information and the authentication time information from the information terminal 200, the authentication server 300 may transmit at least one piece of authentication location information and at least one piece of authentication time information to the information terminal 200 in order to cause the user 10 to select an authentication location and an authentication time. The authentication location and the authentication time to be transmitted to the information terminal 200 may be input to the authentication server 300 by the operator 20.

The authentication server 300 acquires the first ID number and the second ID number corresponding to the authentication location and the authentication time (step S520). The authentication server 300 may acquire the first ID number and the second ID number stored on the storage portion of the authentication server 300. Alternatively, after step S500, the authentication server 300 may transmit the authentication location information and the authentication time information to the information terminal 400 of the operator 20 and acquire the first ID number and the second ID number transmitted by the operator 20 to the authentication server 300 via the information terminal 400.

The authentication server 300 stores the pair of the first ID number and the second ID number on the storage portion thereof (step S540). The authentication server 300 may correlate the first ID number and the second ID number to the user ID number and store the first ID number, the second ID number, and the user ID number in the correlated state.

Hereinafter, an example of user authentication performed by the authentication server 300 will be described with reference to FIG. 7(c).

The authentication server 300 transmits the first ID number to the information terminal 200 before the authentication reception time (step S560).

The authentication server 300 receives, from the information terminal 200, the user ID number, the first ID number, the second ID number, and the biological authentication result within the authentication reception time (step S580). When the authentication server 300 receives the biological authentication result, the biological authentication result and the location authentication result to be generated in step S620 may be correlated to the user ID and stored on the storage portion of the authentication server 300 in the correlated state. Needless to say, a set of the user ID number and the first ID number, a set of the user ID number and the second ID number, and a set of the user ID number and the biological authentication result may be received separately.

The user ID number, the first ID number, the second ID number and the biological authentication result may be received in any order.

The authentication server 300 retrieves the pair of the first ID number and the second ID number from the storage portion of the authentication server 300 (step S600), and compares the pair of the first ID number and the second ID number received from the information terminal 200, and the retrieved pair of the first ID number and the second ID number (step S620). In the case where the pair of the first ID number and the second ID number received from the information terminal 200 matches the retrieved pair of the first ID number and the second ID number, the authentication server 300 determines that the location authentication is successfully made. The time at which the authentication server 300 made such a determination may be correlated to the user ID number and stored on the storage portion of the authentication server 300 in the correlated state.

In step S560, the authentication server 300 may transmit one of the first ID number and the second ID number to the information terminal 200, the information terminal 200 may recognize the other of the first ID number and the second ID number from the beacon signal based on the ID number transmitted from the authentication server 300, and the information terminal 200 may transmit the other ID number to the authentication server 300. In step S580, the authentication server 300 may receive the other ID number. In step S600, the authentication server 300 may retrieve the other of the first ID number and the second ID number stored on the authentication server 300. In step S620, the authentication server 300 may determine whether or not the other ID number received matches the other of the first ID number and the second ID number stored on the authentication server 300.

The authentication server 300 transmits the comprehensive authentication result, which indicates the results of both of the biological authentication and the location authentication, to the information terminal 200 (step S640). In the case where both of the biological authentication and the location authentication are successfully made, the authentication server 300 determines that the comprehensive authentication is successfully made. The authentication server 300 may correlate the comprehensive authentication result to the user ID number and store the comprehensive authentication result in the correlated state on the storage portion of the authentication server 300.

Hereinafter, a user authentication method, a user authentication system and a user authentication application program in embodiment 2 according to the present invention will be described.

In embodiment 1, the information terminal performs the biological authentication. In embodiment 2, the authentication server performs the biological authentication. In general, an authentication server has a higher information processing capability than an information terminal. Therefore, in embodiment 2, the authentication is performed in a shorter time than in embodiment 1. In embodiment 2, the biological information stored on the information terminal is not falsified by a user.

Figure 8:
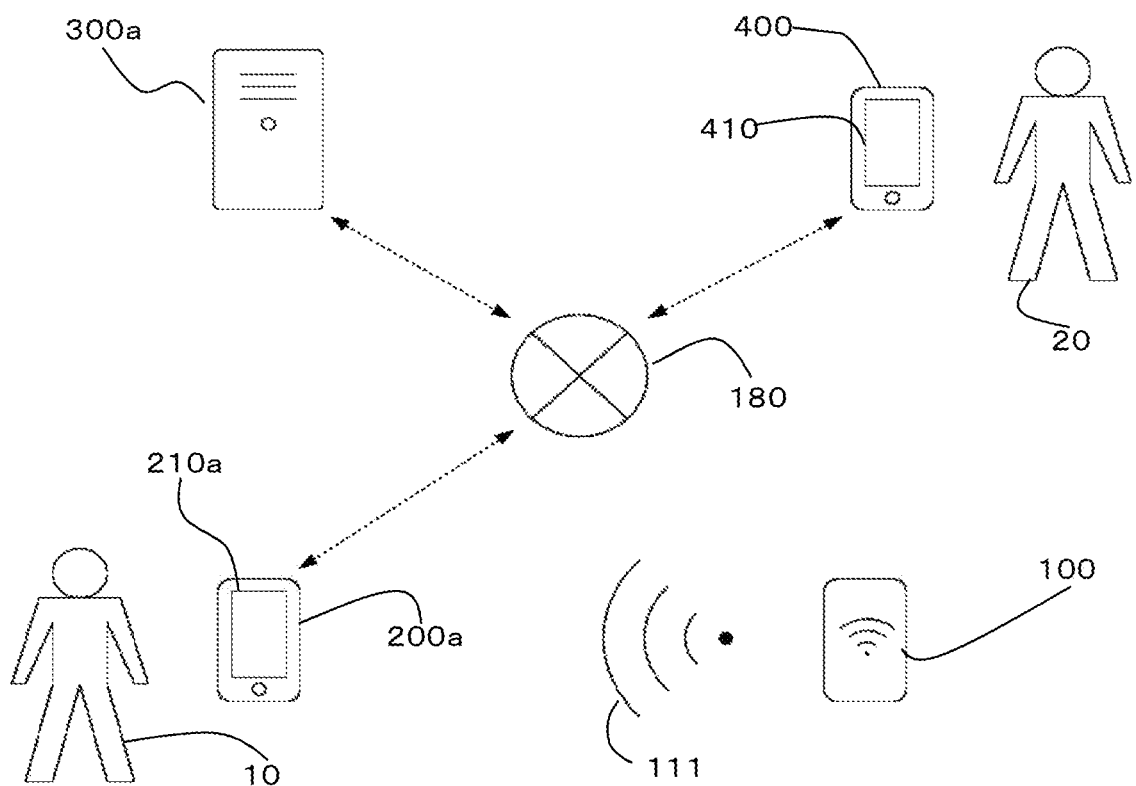
FIG. 8 shows the user authentication method in embodiment 2 according to the present invention.

FIG. 8 shows the user authentication method in embodiment 2 according to the present invention. The user 10 activates the user authentication application program in an information terminal 200a and registers his/her biological information in the information terminal 200a.

FIG. 9 is a flowchart showing an example of user authentication application program in embodiment 2 according to the present invention.

Figure 9A:
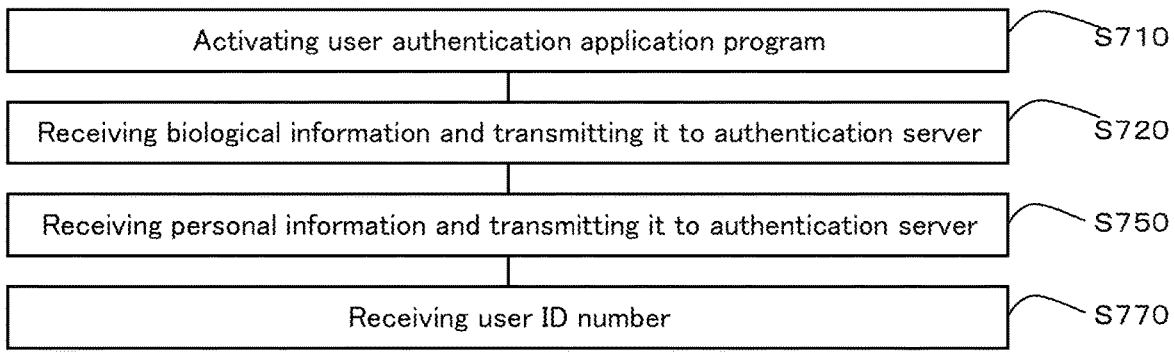
FIG. 9(*a*) is a flowchart showing an example of user authentication application program, specifically, advance registration performed before the user authentication.

FIG. 9(a) is a flowchart showing an example of user authentication application program, specifically, advance registration performed before the user authentication.

In embodiment 2, in step S720, the user authentication application program causes a display portion 210a of the information terminal 200a to display an instruction instructing the user 10 to input his/her biological information. When the user 10 inputs the biological information to the information terminal 200a, the user authentication application program causes the information terminal 200a to transmit the input biological information to the authentication server (step S720). Step S710, step S750 and step S770 are the same as step S10, step S50 and step S70 in an example of embodiment 1, and will not be described here. Step S720 and step S750 may be performed in an opposite order.

Figure 9B:
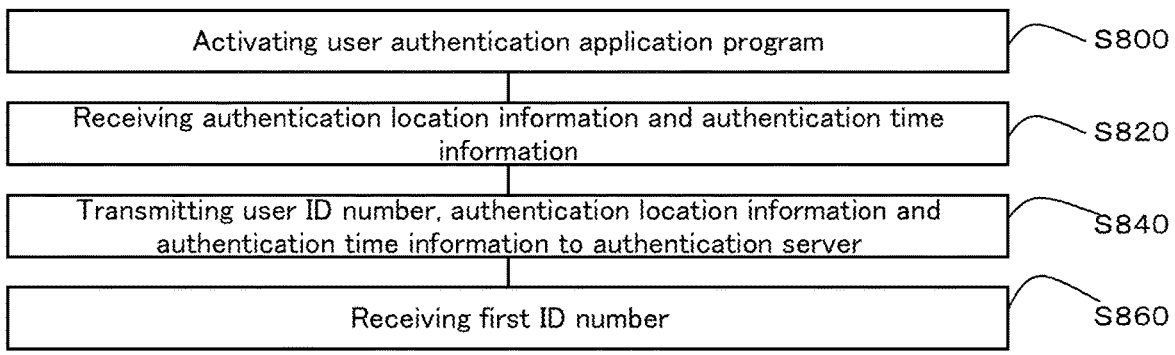

FIG. 9(b) is a flowchart showing an example of steps in which the user acquires the meeting time and the meeting location. Before the user acquires the meeting location and the meeting time, the above-described advance registration is performed. Step S800 through step S860 in FIG. 9(b) are the same as step S100 through step S160 in an example of embodiment 1, and will not be described here.

Figure 9C:
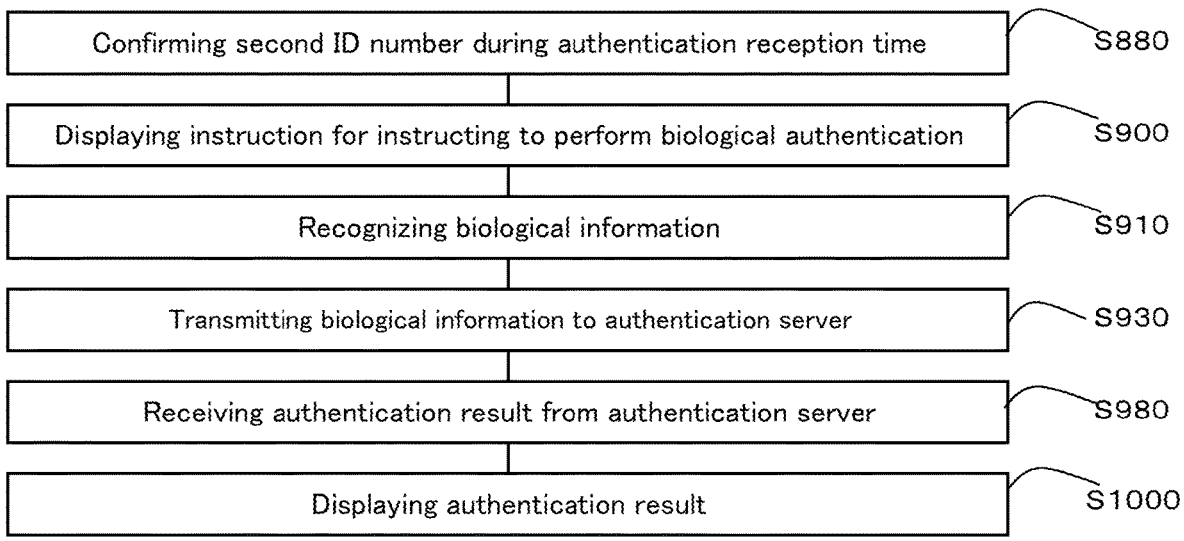

Hereinafter, an example of user authentication performed will be described with reference to FIG. 9(c).

After causing the information terminal 200a to receive the first ID number and during, or before, the authentication reception time, the user authentication application program causes the information terminal 200a to be capable of receiving a beacon signal, to receive a beacon signal including the first ID number and to confirm the second ID number included in the beacon signal (step S880).

After causing the information terminal 200a to confirm the second ID number, the user authentication application program causes the display portion 210a of the information terminal 200a to display an instruction instructing the user 10 to perform the biological authentication (step S900).

The user authentication application program causes the display portion 210a of the information terminal 200a to display an instruction instructing the user 10 to input the biological information. When the biological information is input to the information terminal 200a by the user 10, the user authentication application program causes the information terminal 200a to recognize the input biological information (step S910).

The user 10 may voluntarily input the biological information to the information terminal 200a. In this case, if the information, included in the beacon signal, to be confirmed, for example, the second ID number, is not confirmed, the procedure does not advance to step S930.

The user authentication application program transmits the recognized biological information to the authentication server 300a (step S930).

The user authentication application program causes the information terminal 200a to receive the authentication result from the authentication server 300a (step S980), and causes the display portion 210a of the information terminal 200a to display the authentication result (step S1000).

Figure 10A:
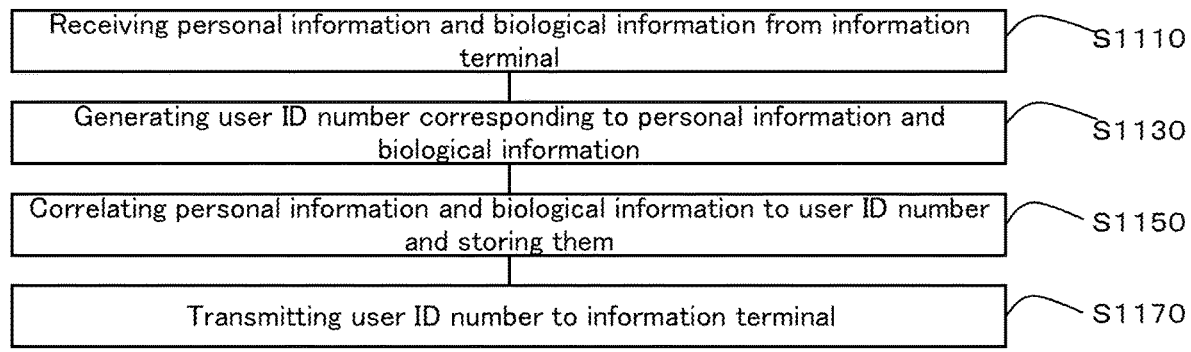
FIG. 10 is a flowchart showing an example of user authentication application program, specifically, advance registration performed before the user authentication.

FIG. 10(a) is a flowchart showing an example of user authentication application program, specifically, advance registration performed before the user authentication.

Upon receipt of the personal information and the biological information from the information terminal 200a (step S1110), the authentication server 300a generates a user ID number corresponding to the personal information and the biological information (step S1130). The authentication server 300a correlates the user ID number to the personal information and the biological information, and stores the user ID number, the personal information and the biological information in the correlated state on the storage portion of the authentication server 300a (step S1150). The authentication server 300a transmits the User ID number to the information terminal 200a (step S1170).

The personal information correlated with the user ID number, and the biological information correlated with the user ID number, may be stored separately in different storage regions. The authentication server 300a may generate the user ID number upon receipt of either one of the personal information and the biological information.

Figure 10B:
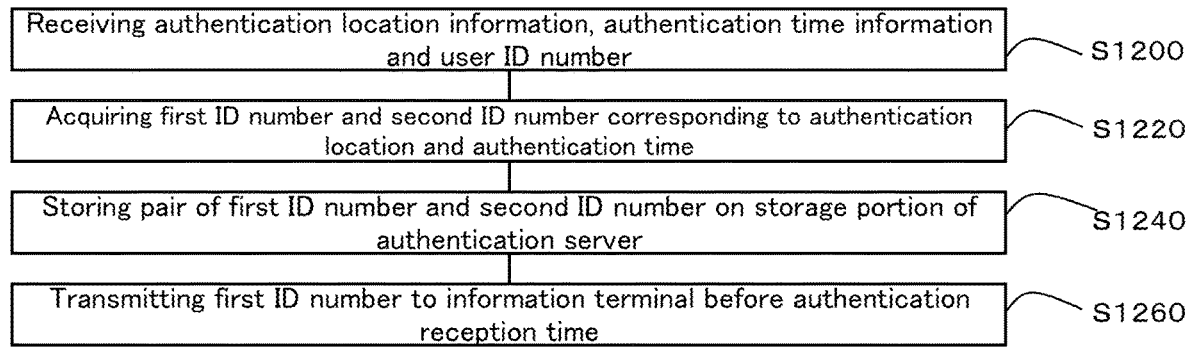

Hereinafter, an example of steps in which the user acquires the meeting location and the meeting time will be described with reference to FIG. 10(b). Before the user acquires the meeting location and the meeting time, the above-described advance registration is performed.

The authentication server 300a receives, from the information terminal 200a, the authentication location information, the authentication time information, and the user ID number (step S1200). Before receiving the authentication location information and the authentication time information from the information terminal 200a, the authentication server 300a may transmit at least one piece of authentication location information and at least one piece of authentication time information to the information terminal 200a in order to cause the user 10 to select an authentication location and an authentication time. The authentication location and the authentication time to be transmitted to the information terminal 200a may be input to the authentication server 300a by the operator 20.

The authentication server 300a acquires the first ID number and the second ID number corresponding to the authentication location and the authentication time (step S1220). The authentication server 300a may acquire the first ID number and the second ID number stored on the storage portion of the authentication server 300a. Alternatively, after step S1200, the authentication server 300a may transmit the authentication location information and the authentication time information to the information terminal 400 of the operator 20 and acquire the first ID number and the second ID number transmitted by the operator 20 to the authentication server 300a via the information terminal 400.

The authentication server 300a stores the pair of the first ID number and the second ID number on the storage portion thereof (step S1240). The authentication server 300a may correlate the user ID number, the first ID number and the second ID number to each other and store the ID numbers in the correlated state on the storage portion.

The authentication server 300a transmits the first ID number to the information terminal 200a before the authentication reception time (step S1260).

Figure 10C:
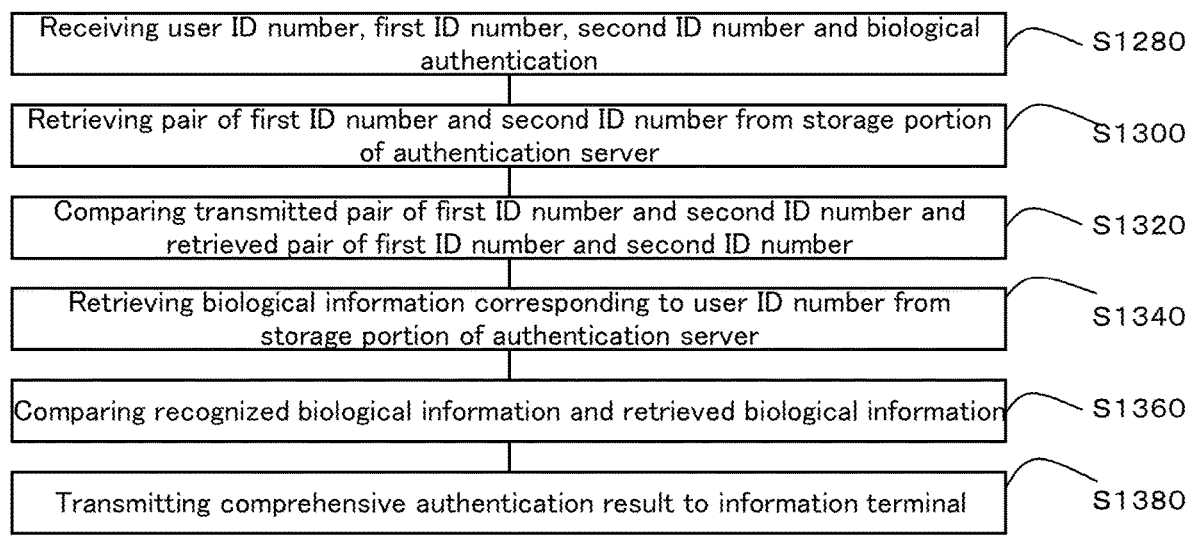

Hereinafter, an example of user authentication performed by the authentication server 300a will be described with reference to FIG. 10(c).

The authentication server 300a receives, from the information terminal 200a, the user ID number, the first ID number, the second ID number, and a biological authentication result within the authentication reception time (step S1280). Needless to say, a set of the user ID number and the first ID number, a set of the user ID number and the second ID number, and a set of the user ID number and the biological authentication result may be received separately.

The authentication server 300a retrieves the pair of the first ID number and the second ID number from the storage portion of the authentication server 300a (step S1300), and compares the received pair of the first ID number and the second ID number and the retrieved pair of the first ID number and the second ID number in order to obtain a location authentication result (step S1320).

In the case where the received pair of the first ID number and the second ID number matches the retrieved pair of the first ID number and the second ID number, the authentication server 300a determines that the location authentication is successfully made. The time at which the authentication server 300a made such a determination may be correlated to the user ID number and stored on the storage portion of the authentication server 300a in the correlated state.

The authentication server 300a retrieves the biological information corresponding to the user ID number from the storage portion of the authentication server 300a (step S1340), and compares the received biological information and the retrieved biological information (step S1360).

In the case where the received biological information matches the retrieved biological information, the authentication server 300a determines that the biological authentication is successfully made. The time at which the authentication server 300a made such a determination may be correlated to the user ID number and stored on the storage portion of the authentication server 300a in the correlated state.

In the case where the two pieces of biological information do not match each other, the authentication server 300a may request the information terminal 200a for biological information. When the biological information is requested, the information terminal 200a performs step S910. In the case where the two pieces of biological information still do not match each other, the authentication server 300a may request the information terminal 200a for biological information a predetermined number of times.

In S1260, the authentication server 300a may transmit one of the first ID number and the second ID number to the information terminal 200a, the information terminal 200a may recognize the other of the first ID number and the second ID number from the beacon signal based on the ID number transmitted from the authentication server 300a, and the information terminal 200a may transmit the other ID number to the authentication server 300a. In step S1280, the authentication server 300a may receive the other ID number. In step S1300, the authentication server 300a may retrieve the other of the first ID number and the second ID number stored on the authentication server 300a. In step S1320, the authentication server 300a may determine whether or not the other ID number received matches the other of the first ID number and the second ID number stored on the authentication server 300a.

The authentication server 300a transmits a comprehensive authentication result, which indicates the results of both of the biological authentication and the location authentication, to the information terminal 200a (step S1380). In the case where both of the biological authentication and the location authentication are successfully made, the authentication server 300a determines that the comprehensive authentication is successfully made. The authentication server 300a may correlate the comprehensive authentication result to the user ID number and store the comprehensive authentication result in the correlated state on the storage portion of the authentication server 300a.

Hereinafter, a user authentication method, a user authentication system and a user authentication application program in embodiment 3 according to the present invention will be described.

In embodiment 1, the information terminal performs the biological authentication. In embodiment 3, the information terminal and the authentication server perform the biological authentication. In general, biological information stored on an authentication server is rarely falsified. In embodiment 3, even if the biological information stored on the authentication server is falsified, the biological information stored on the information terminal prevents a person who is not a user who has made advance registration from being erroneously authenticated at the location where the location authentication is performed.

Figure 11:
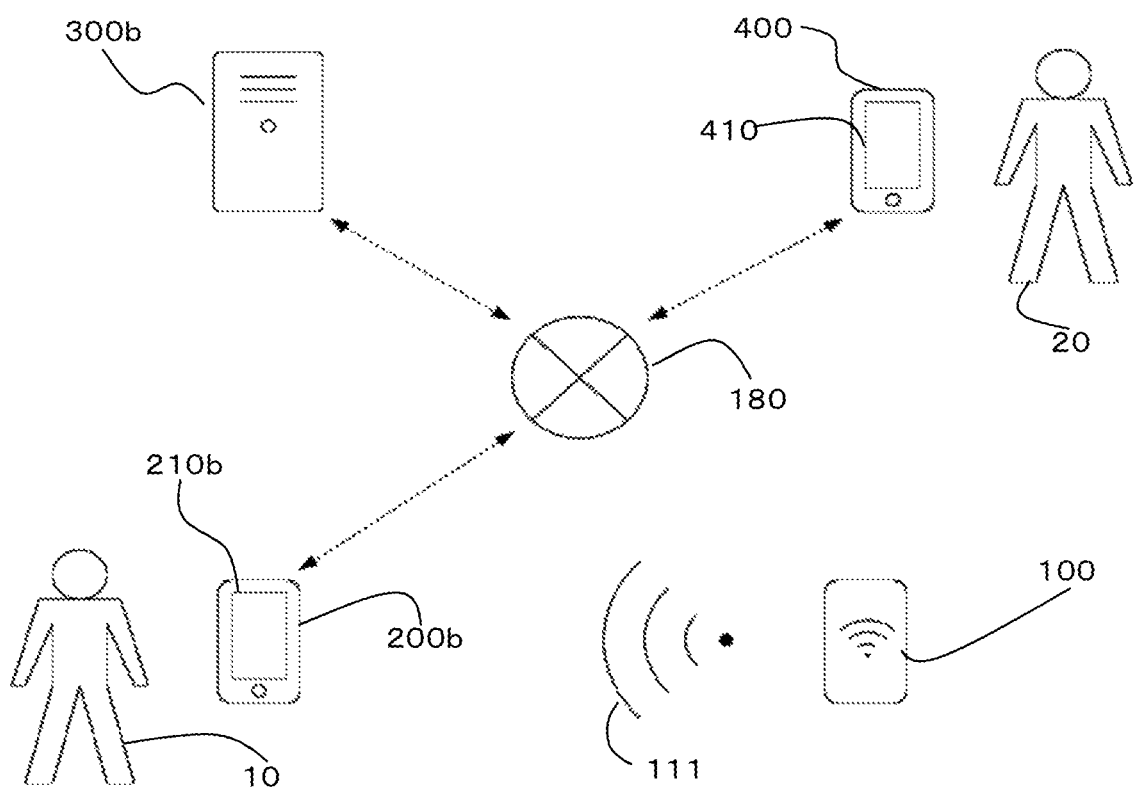
FIG. 11 shows a user authentication method in embodiment 3 according to the present invention.

FIG. 11 shows a user authentication method in embodiment 3 according to the present invention. The user 10 activates the user authentication application program in an information terminal 200*b* and registers his/her biological information in the information terminal 200*b*.

Figure 12:
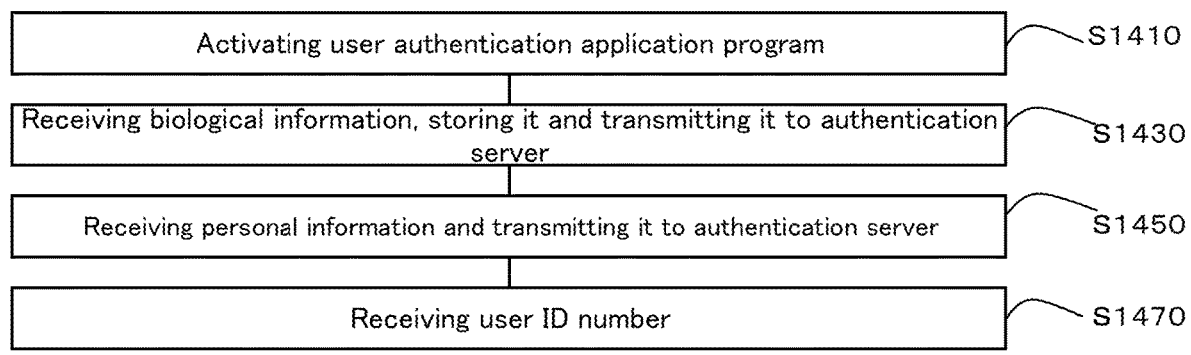
FIG. 12 is a flowchart showing an example of user authentication application program in embodiment 3 according to the present invention.

FIG. 12 is a flowchart showing an example of user authentication application program in embodiment 3 according to the present invention. An example of advance registration performed before the user authentication will be described with reference to FIG. 12.

The user 10 operates the information terminal 200*b* to activate the user authentication application program (step S1410). The user authentication application program causes a display portion 210*b* of the information terminal 200*b* to display an instruction instructing the user 10 to input his/her biological information. When the user 10 inputs the biological information to the information terminal 200*b*, the user authentication application program causes the information terminal 200*b* to store the input biological information thereon and to transmit the input biological information to an authentication server 300*b* (step S1430).

The user authentication application program causes the display portion 210*b* of the information terminal 200*b* to display an instruction instructing the user 10 to input his/her personal information. When the user 10 inputs the personal information to the information terminal 200*b*, the information terminal 200*b* transmits the input personal information to the authentication server 300*b* (step S1450).

The user authentication application program causes the information terminal 200*b* to receive the user ID number transmitted from the authentication server 300*b* and to store the user ID number on a storage portion of the information terminal 200*b* (step S1470).

The information terminal 200*b* performs step S1410 through step S1470 and thus the advance registration before the user authentication is finished. Step S1430 and step S1450 may be performed in an opposite order.

In embodiment 3, the user authentication application program may perform step S100 through step S200 in embodiment 1. In step S220, the user authentication application program may cause the information terminal 200*b* to recognize the input biological information and to transmit the biological information to the authentication server 300*b*. The user authentication application program may perform step S240 through step S300 to perform the user authentication.

The user authentication system in embodiment 3 may perform the advance registration before the user authentication by performing step S1110 through step S1170 shown in FIG. 10(*a*).

Figure 13:
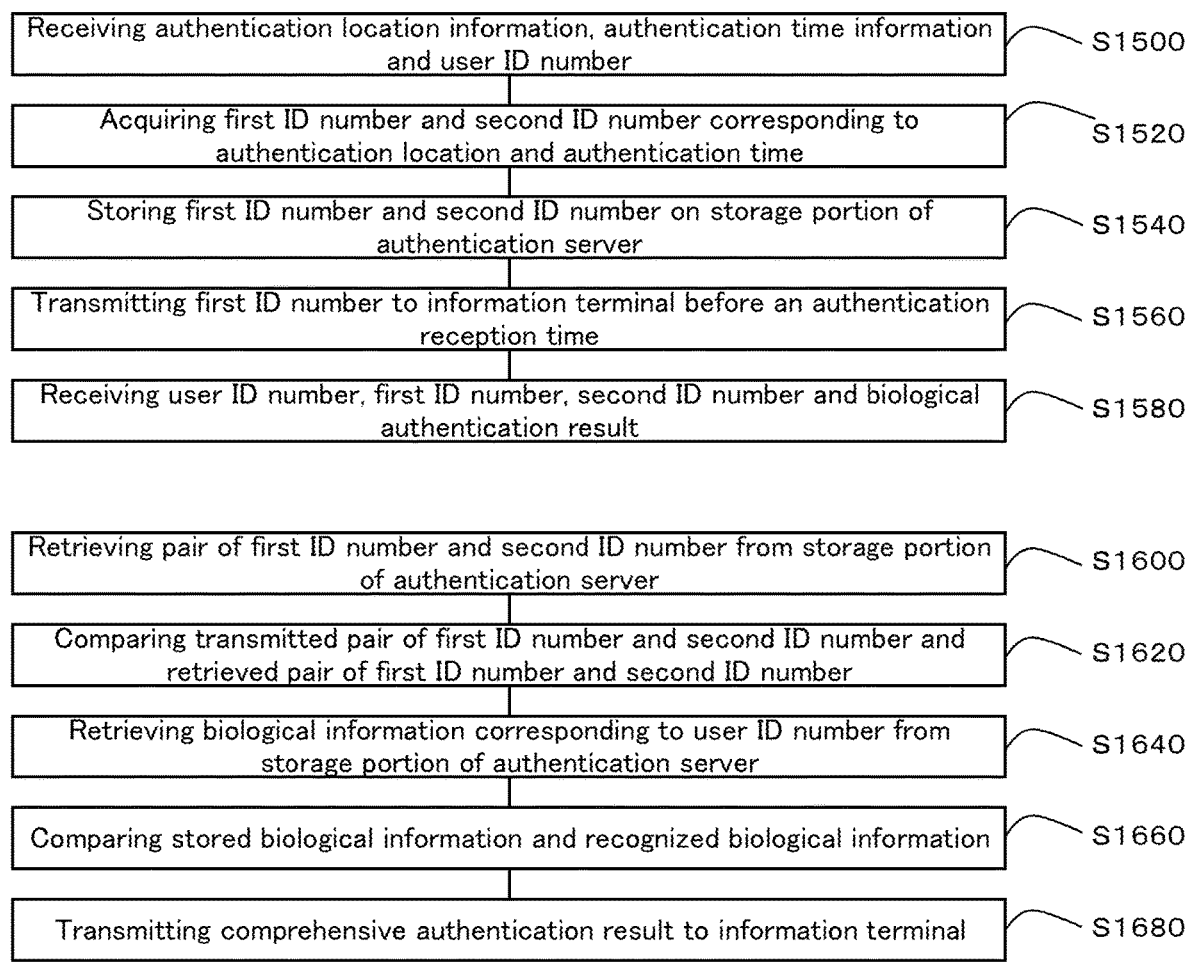
FIG. 13 is a figure for explaining an example of user authentication performed by the user authentication system in embodiment 3.

An example of user authentication performed by the user authentication system in embodiment 3 will be described with reference to with reference to FIG. 13. Before the user authentication, the user ID number and the like are advance-registered by the information terminal 200*b*.

The authentication server 300*b* receives, from the information terminal 200*b*, the authentication location information, the authentication time information, and the user ID number (step S1500). Before receiving the authentication location information and the authentication time information from the information terminal 200*b*, the authentication server 300*b* may transmit at least one piece of authentication location information and at least one piece of authentication time information to the information terminal 200*b* in order to cause the user 10 to select an authentication location and an authentication time. The authentication location and the authentication time to be transmitted to the information terminal 200*b* may be input to the authentication server 300*b* by the operator 20.

The authentication server 300*b* acquires the first ID number and the second ID number corresponding to the authentication location and the authentication time (step S1520). The authentication server 300*b* may acquire the first ID number and the second ID number stored on a storage portion of the authentication server 300*b*. Alternatively, after step S1500, the authentication server 300*b* may transmit the authentication location information and the authentication time information to the information terminal 400 of the operator 20 and acquire the first ID number and the second ID number transmitted by the operator 20 to the authentication server 300*b* via the information terminal 400.

The authentication server 300*b* stores the pair of the first ID number and the second ID number on the storage portion thereof (step S1540). The authentication server 300*b* may correlate the first ID number and the second ID number to the user ID number and store the first ID number and the second ID in the correlated state on the storage portion.

The authentication server 300*b* transmits the first ID number to the information terminal 200*b* before the authentication reception time (step S160).

The authentication server 300*b* receives, from the information terminal 200*b*, the user ID number, the first ID number, the second ID number, biological information, and a biological authentication result within the authentication reception time (step S1580). Needless to say, a set of the user ID number and the first ID number, a set of the user ID number and the second ID number, a set of the user ID and the biological information, and a set of the user ID number and the biological authentication result may be received separately.

The authentication server 300*b* retrieves the pair of the first ID number and the second ID number from the storage portion of the authentication server 300*b* (step S1600), and compares the received pair of the first ID number and the second ID number and the retrieved pair of the first ID number and the second ID number in order to obtain a location authentication result (step S1620).

In the case where the received pair of the first ID number and the second ID number matches the retrieved pair of the first ID number and the second ID number, the authentication server 300*b* determines that the location authentication is successfully made. The time at which the authentication server 300*b* made such a determination may be correlated to the user ID number and stored in the correlated state on the storage portion of the authentication server 300*b*.

The authentication server 300*b* retrieves the biological information corresponding to the user ID number from the storage portion of the authentication server 300*b* (step S1640), and compares the received biological information and the retrieved biological information (step S1660).

In the case where the received biological information matches the retrieved biological information, the authentication server 300*b* determines that the biological authentication is successfully made. The time at which the authentication server 300*b* made such a determination may be correlated to the user ID number and stored in the correlated state on the storage portion of the authentication server 300*b*.

In the case where the two pieces of biological information do not match each other, the authentication server 300*b* may request the information terminal 200*b* for biological information. When the biological information is requested, the information terminal 200*b* performs step S720. In the case where the two pieces of biological information still do not match each other, the authentication server 300*b* may request the information terminal 200b for biological information a predetermined number of times.

In S1560, the authentication server 300b may transmit one of the first ID number and the second ID number to the information terminal 200b, the information terminal 200b may recognize the other of the first ID number and the second ID number from the beacon signal based on the ID number transmitted from the authentication server 300b, and the information terminal 200b may transmit the other ID number to the authentication server 300b. In step S1580, the authentication server 300b may receive the other ID number. In step S1600, the authentication server 300b may retrieve the other of the first ID number and the second ID number stored on the authentication server 300b. In step S1620, the authentication server 300b may determine whether or not the other ID number received matches the other of the first ID number and the second ID number stored on the authentication server 300b.

The authentication server 300b transmits a comprehensive authentication result, which indicates the results of all of the biological authentication performed by the information terminal 200b, the biological authentication performed by the authentication server 300b, and the location authentication result, to the information terminal 200b (step S1680). In the case where all of the biological authentication performed by the information terminal 200b, the biological authentication performed by the authentication server 300b, and the location authentication are successfully made, the authentication server 300b determines that the comprehensive authentication is successfully made. The authentication server 300b may correlate the comprehensive authentication result to the user ID number and store the comprehensive authentication result in the correlated state on the storage portion of the authentication server 300b.

Hereinafter, a user authentication method, a user authentication system and a user authentication application program in embodiment 4 according to the present invention will be described.

Figure 14:
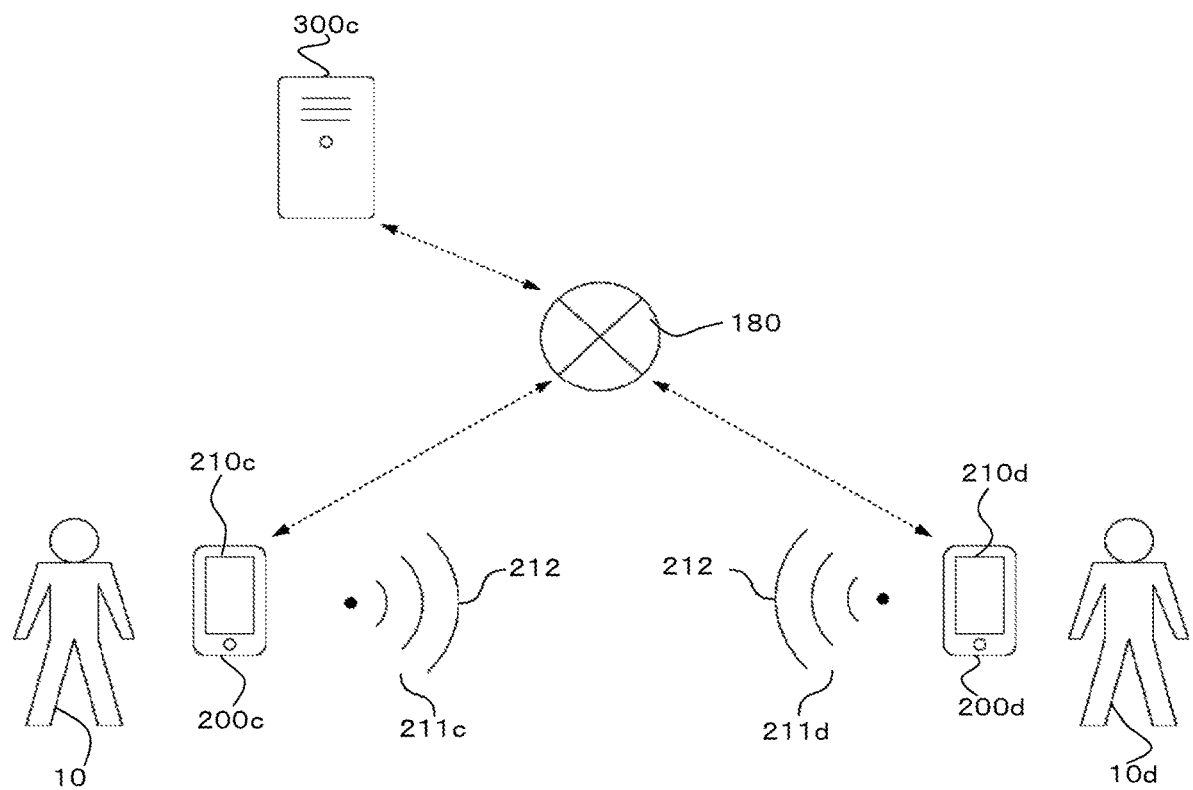
FIG. 14 shows a user authentication method in embodiment 4 according to the present invention.

FIG. 14 shows a user authentication method in embodiment 4 according to the present invention. In embodiment 4, two users perform the biological authentication and the location authentication by use of respective information terminals capable of transmitting and receiving a beacon signal.

Figure 3A:
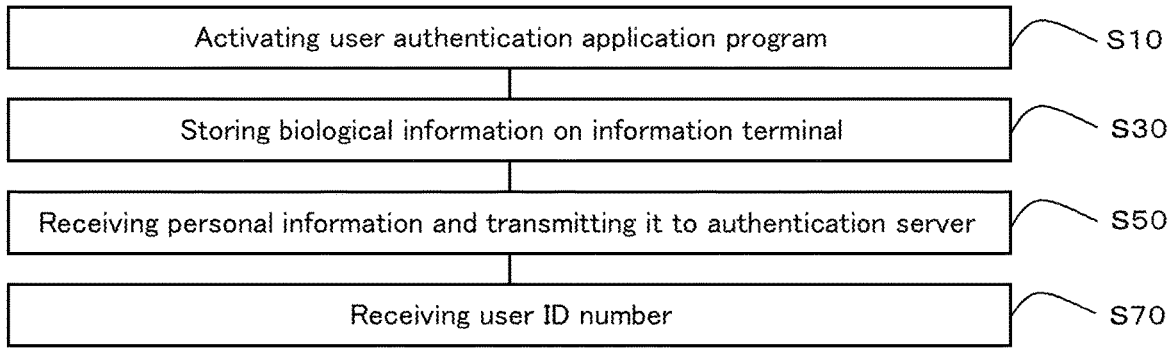
FIG. 3(a) is a flowchart showing an example of user authentication application program, specifically, advance registration performed before the user authentication.
Figure 3B:
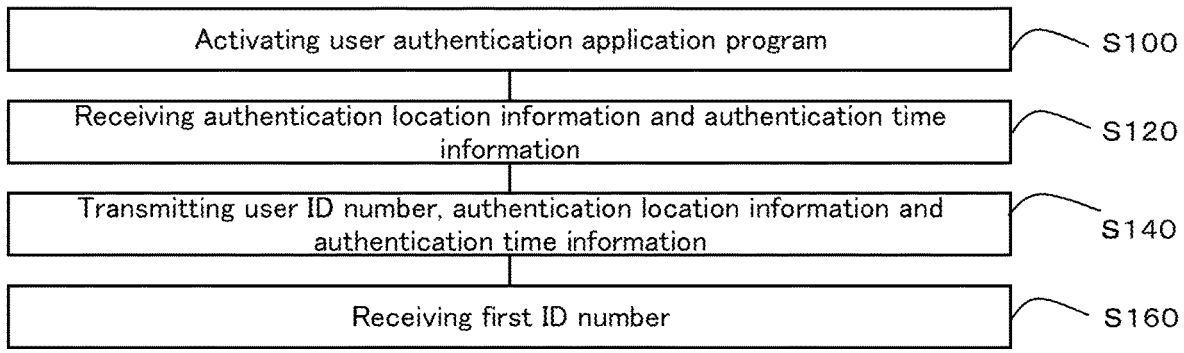
FIG. 3(b) is a flowchart showing an example of user authentication application program in which the user acquires the meeting time and the meeting location.
Figure 3C:
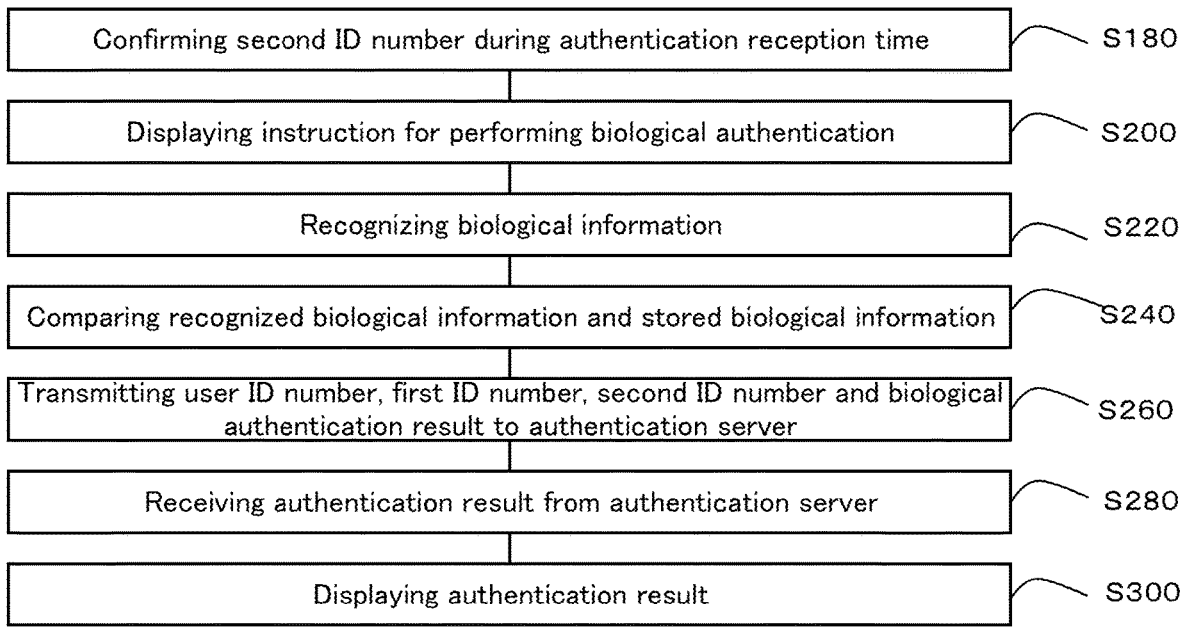

In the user authentication application program in embodiment 4, information terminals 200c and 200d may perform step S10 through step S70 shown in FIG. 3(a) to perform advance registration before the user authentication.

Figure 15:
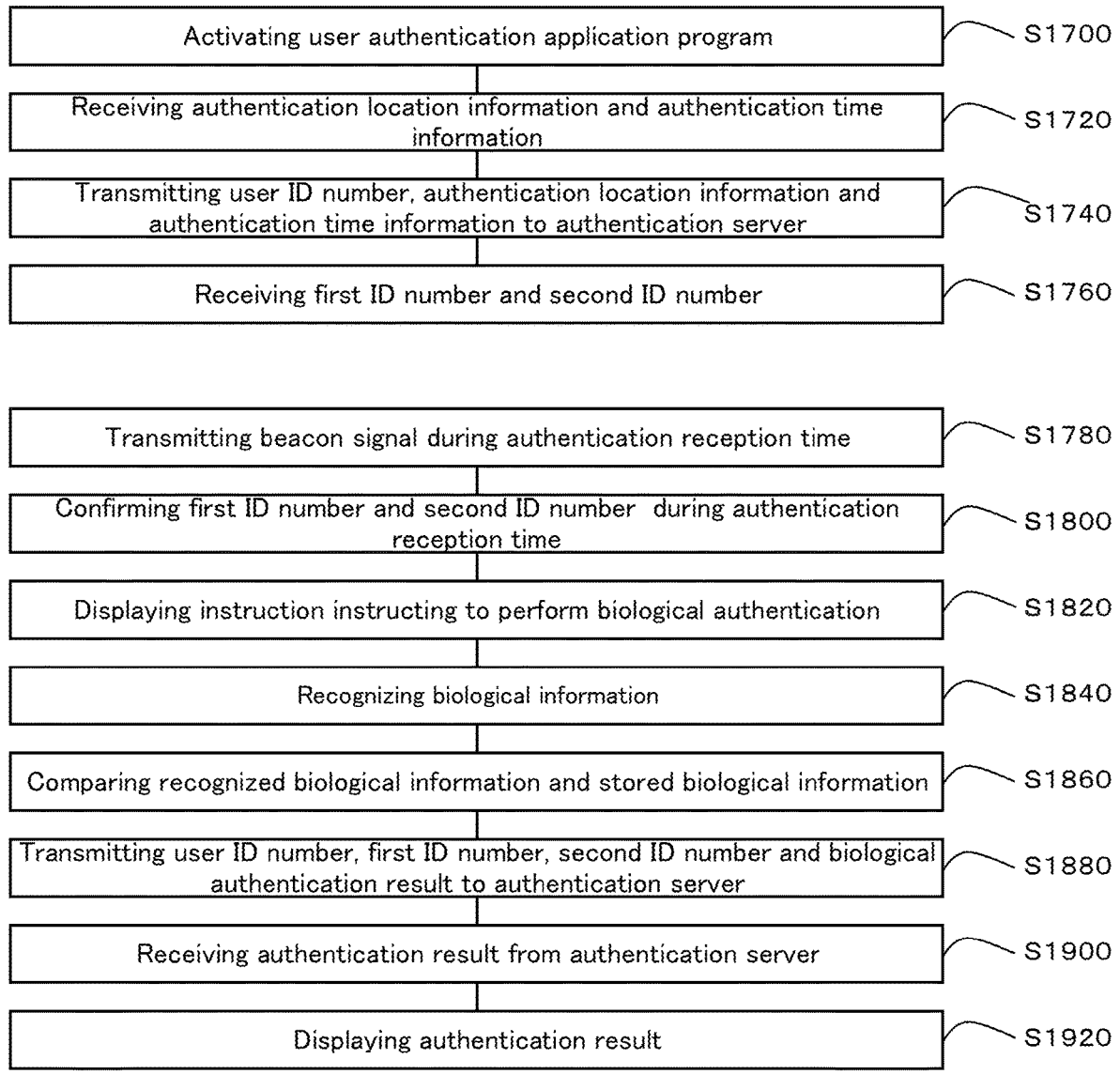
FIG. 15 is a flowchart showing an example of user authentication application program in embodiment 4.

FIG. 15 is a flowchart showing an example of user authentication application program in embodiment 4. Hereinafter, an example of user authentication will be described with reference to FIG. 15. Before the user authentication, the above-described advance registration is performed.

The user 10 operates the information terminal 200c to activate the user authentication application program (step S1700). The user authentication application program causes a display portion 210c of the information terminal 200c to display an instruction instructing the user 10 to input the authentication location and the authentication time. When the user 10 inputs the authentication location and the authentication time to the information terminal 200c, the user authentication application program causes the information terminal 200c to receive the authentication location information and the authentication time information (step S1720).

The user 10 may input the authentication location and the authentication time by selecting the authentication location and the authentication time displayed on the display portion 210c of the information terminal 200c, or may directly input numerical values and letters by use of the touch panel or the keys of the information terminal 200c. In the case where the user 10 selects the authentication location and the authentication time, the user authentication application program may instruct the information terminal 200c to receive the authentication location information and the authentication time information from an authentication server 300c.

After the authentication location information and the authentication time information input by the user 10 are received, the user authentication application program instructs the information terminal 200c to transmit the user ID number, the authentication location information and the authentication time information stored on a storage portion of the information terminal 200c to the authentication server 300c (step S1740).

Similarly, the user authentication application program causes the information terminal 200d to perform step S1720 through step S1740. The expression "similarly, . . . perform the steps" indicates that, for example, the steps described as being performed by the "information terminal 200c" are also performed by the "information terminal 200d", and the steps described as being performed by the "information terminal 200d" are also performed by the "information terminal 200c", as is obvious to a person of ordinary skill in the art. This is also applicable to the rest of the specification.

The user authentication application program causes the information terminal 200c to receive the first ID number and the second ID number transmitted from the authentication server 300c and to store the first ID number and the second ID number on the storage portion of the information terminal 200c (step S1760).

Similarly, a user authentication application program installed on the information terminal 200d performs step S1720 through step S1760.

At least one of the first ID number and second ID number may be generated by, and stored on, the authentication server 300c. At least one of the first ID number and second ID number may be input from outside to the authentication server 300c and stored on the authentication server 300c. For example, the user authentication application program installed on the information terminal 200d may transmit the second ID number regarding the information terminal 200d to the authentication server 300c in advance, the authentication server 300c may store the second ID number, the authentication server 300c may generate and store the first ID number, the user authentication application program installed on the information terminal 200c may transmit the second ID number regarding the information terminal 200c to the authentication server 300c in advance, and the authentication server 300c may store the second ID number regarding the information terminal 200c.

The information terminals 200c and 200d respectively transmit beacon signals 211c and 211d. The beacon signals 211c and 211d each include a common first ID number 212. The beacon signal 211c may include the second ID number indicating that the beacon signal 211c has been transmitted from the information terminal 200c. The beacon signal 211d may include the second ID number indicating that the beacon signal 211d has been transmitted from the information terminal 200d.

After causing the information terminal 200c to receive the first ID number 212 and the second ID number regarding the information terminal 200c and during, or slightly before, the authentication reception time, the user authentication application program of the information terminal 200c causes the information terminal 200c to transmit the beacon signal 211c including the first ID number 212 and the second ID number regarding the information terminal 200c (step S1780). Similarly, after causing the information terminal 2000 to receive the first ID number 212 and the second ID number regarding the information terminal 200d and during, or slightly before, the authentication reception time, the user authentication application program of the information terminal 200d causes the information terminal 200d to transmit the beacon signal 211d including the first ID number 212 and the second ID number regarding the information terminal 200d (step S1780).

The user authentication application program of the information terminal 200c causes the information terminal 200c to be capable of receiving the beacon signal and to confirm the first ID number 212 and the second ID number in the received beacon signal 211d (step S1800). Similarly, the user authentication application program of the information terminal 200d causes the information terminal 200d to be capable of receiving the beacon signal and to confirm the first ID number 212 and the second ID number in the received beacon signal 211c (Step S1800).

After causing the information terminal 200c to confirm the first ID number and the second ID number in the received beacon signal 211d, the user authentication application program of the information terminal 200c causes the display portion 210c of the information terminal 200c to display an instruction instructing the user 10 to perform the biological authentication (step S1820). Similarly, the user authentication application program of the information terminal 200d causes the information terminal 200d to perform step S1820.

The user authentication application program of the information terminal 200c causes the display portion 210c of the information terminal 200c to display an instruction instructing the user 10 to input the biological information. When the user 10 inputs the biological information to the information terminal 200c, the user authentication application program causes the information terminal 200c to recognize the input biological information (Step S1840). Similarly, the user authentication application program of the information terminal 200d causes the information terminal 200d to perform step S1840.

The user 10 and a user 10d may voluntarily input the biological information respectively to the information terminals 200c and 200d. In this case, if the information, included in the beacon signal, to be confirmed, for example, the second ID number, is not confirmed, the procedure does not advance to step S1860.

The user authentication application program of the information terminal 200c compares the recognized biological information, and the biological information stored on the storage portion of the information terminal 200c, and causes the information terminal 200c to determine whether the two pieces of biological information match each other (step S1860). Similarly, the user authentication application program of the information terminal 200d causes the information terminal 200d to perform step S1860.

In the case where the two pieces of biological information match each other, the user authentication application program of the information terminal 200c causes the information terminal 200c to transmit the user ID number, the received first ID number, the received second ID number, and the biological authentication result to the authentication server 300c (step S1880). Needless to say, a set of the user ID number and the received first ID number, a set of the user ID number and the second ID number, and a set of the user ID number and the biological authentication result may be transmitted separately. Similarly, the user authentication application program of the information terminal 200d causes the information terminal 200d to perform step S1880.

In the case where the two pieces of biological information do not match each other, the user authentication application program of the information terminal 200c may cause the information terminal 200c to perform step S1840 and step S1860 a predetermined number of times. Similarly, in the case where the two pieces of biological information do not match each other, the user authentication application program of the information terminal 200d may cause the information terminal 200d to perform step S1840 and step S1860 a predetermined number of times.

In the case where the two pieces of biological information do not match each other even after step S1840 and step S1860 are performed the predetermined number of times, the user authentication application program of the information terminal 200c may cause the display portion 210c of the information terminal 200c to display a message that the two pieces of biological information do not match each other or the authentication is not successfully made. Similarly, in the case where the two pieces of biological information do not match each other even after step S1840 and step S1860 are performed the predetermined number of times, the user authentication application program of the information terminal 200d may cause a display portion 210d of the information terminal 200d to display a message that the two pieces of biological information do not match each other or the authentication is not successfully made.

In the case where the two pieces of biological information do not match each other even after step S1840 and step S1860 are performed the predetermined number of times, the user authentication application program of the information terminal 200c may cause the information terminal 200c to transmit, to the authentication server 300c, the user ID number, the received first ID number, the received second ID number, and the biological authentication result. Similarly, in the case where the two pieces of biological information do not match each other even after step S1840 and step S1860 are performed the predetermined number of times, the user authentication application program of the information terminal 200d may cause the information terminal 200d to transmit, to the authentication server 300c, the user ID number, the received first ID number, the received second ID number, and the biological authentication result.

The user authentication application program of the information terminal 200c causes the information terminal 200c to receive the authentication result from the authentication server 300c (step S1900), and causes the display portion 210c of the information terminal 200c to display the authentication result (step S1920). Similarly, the user authentication application program of the information, terminal 200d causes the information terminal 200d to perform step S1900 and step S1920.

The confirmation in step S1800 may be performed when the information terminal 200c is located within a range having a distance D from the information terminal 200d. Where the electric field intensity is E when the distance from the information terminal 200a is D, the user authentication application program of the information terminal 200c may cause the information terminal 200c to confirm the first ID number in the received beacon signal when the electric field intensity of the beacon signal 211d is E or greater. Similarly, the user authentication application program of the information terminal 200d may cause the information terminal 200d to confirm the first ID number in the received beacon signal when the electric field intensity of the beacon signal 211c is E or greater.

The determination in step S1860 may be performed as follows. The recognized biological information and the biological information stored on the storage portion of each of the information terminals 200c and 200a are sampled, and a total value of matching points out of the sampling points is found. In the case where the total value is higher than, or equal to, the threshold value X, the user authentication application program may determine that the two pieces of biological information match each other. In the case where the total value is lower than the threshold value X, the user authentication application program may determine that the two pieces of biological information do not match each other.

Figure 7A:
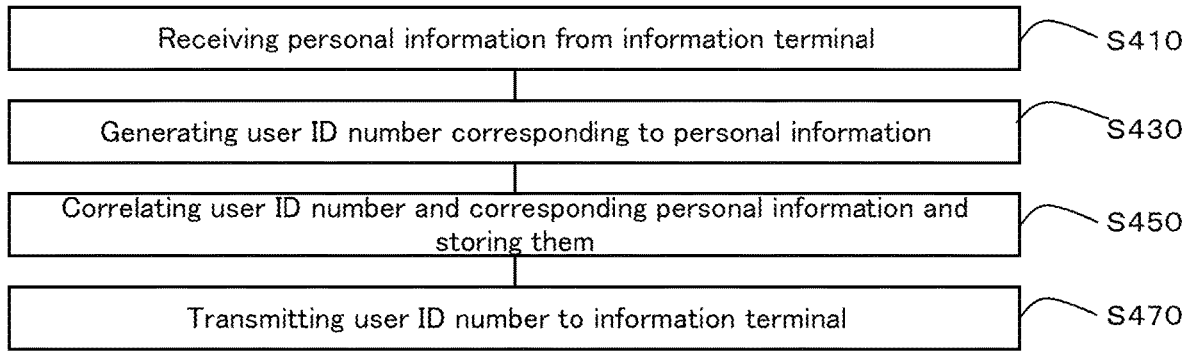
FIG. 7(a) is a flowchart showing an example of the flow of the authentication server 300 in the advanced registration before performing user authentication.
Figure 7B:
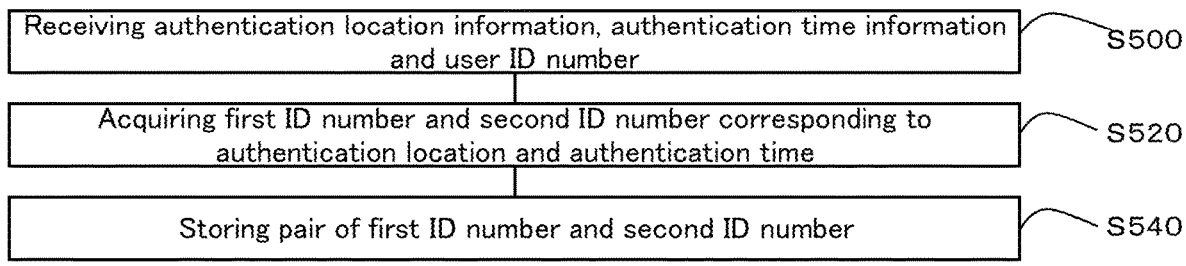
FIG. 7(b) is a figure showing an example of the flow of handling of the authentication location information, the authentication time information, the first ID number and the second ID number by the authentication server 300.
Figure 7C:
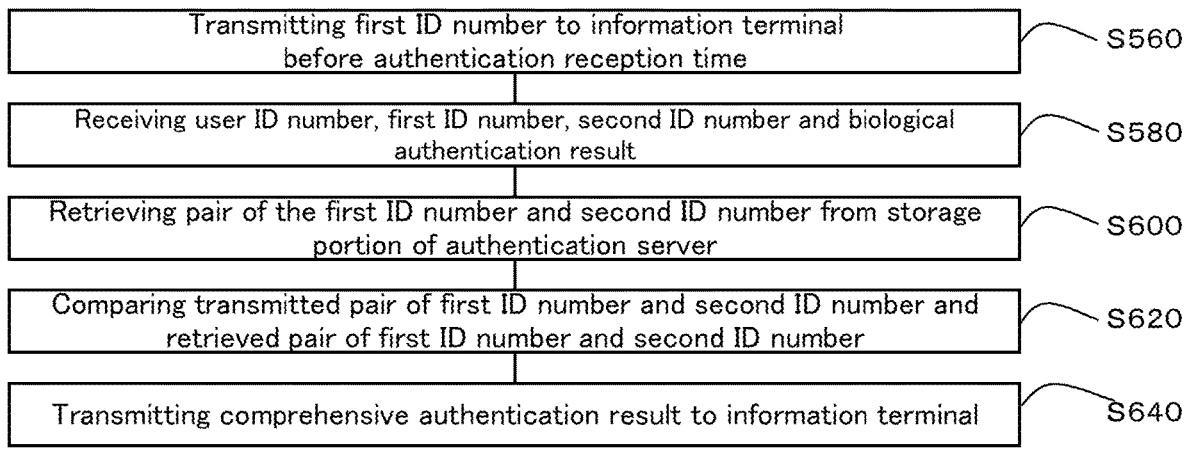
FIG. 7(*c*) is a figure showing a flow example of the user authentication by the authentication server 300.

In the user authentication system in embodiment 4, the authentication server 300c may perform the step S410 through step S470 shown in FIG. 7(a) to exchange information with each of the information terminals 200c and 200d, so that the advance registration before the user authentication may be performed.

Figure 16:
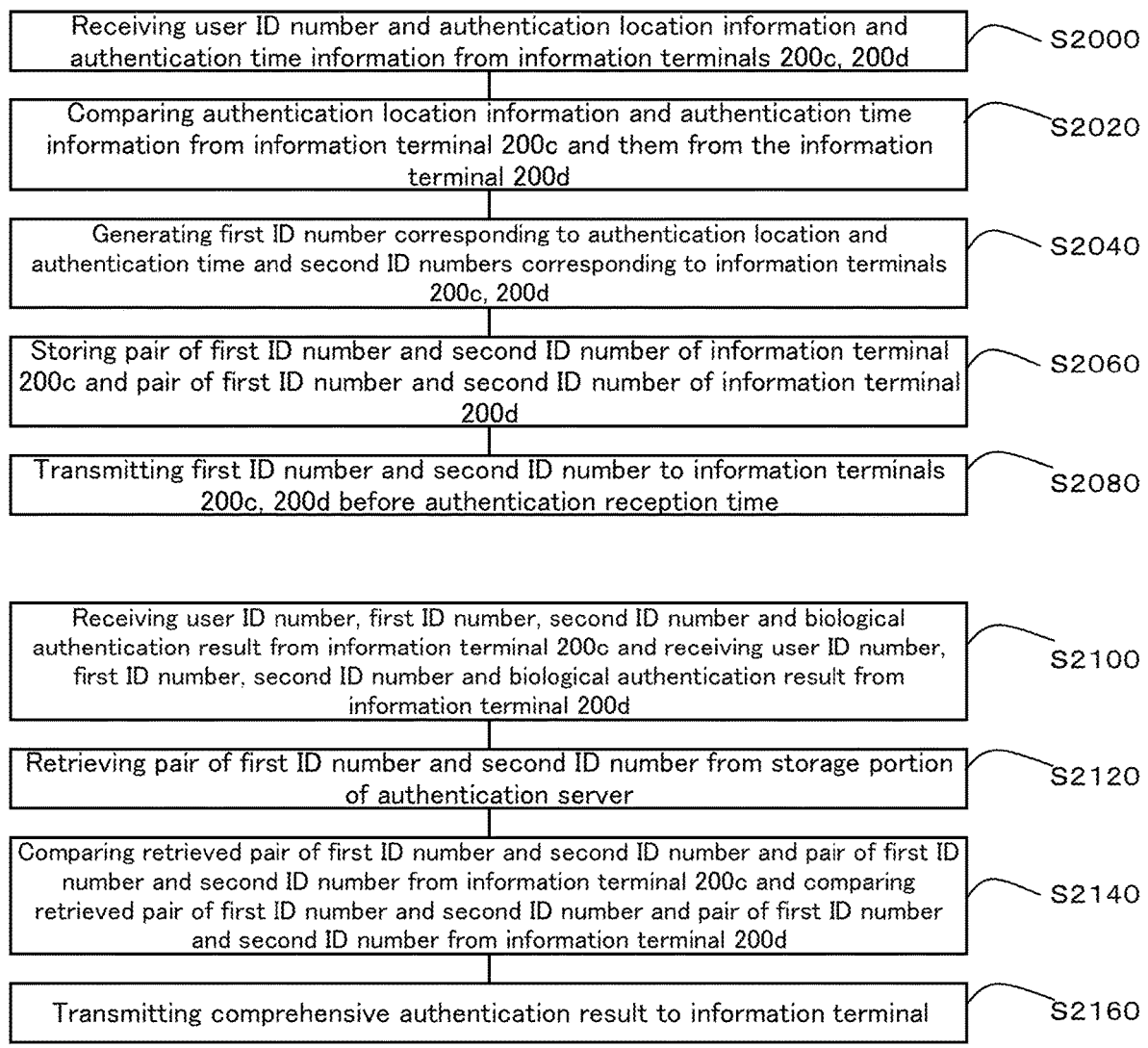
FIG. 16 is a figure showing an example of user authentication.

Hereinafter, an example of user authentication will be described with reference to with reference to FIG. 16. Before the user authentication, the advance registration is performed by the information terminals 200c and 200d.

The authentication server 300c receives, from the information terminals 200c and 200d, the authentication location information, the authentication time information, and the user ID number (step S2000). Before receiving the authentication location information and the authentication time information from the information terminals 200c and 200d, the authentication server 300c may transmit at least one piece of authentication location information and at least one piece of authentication time information to the information terminals 200c and 200d in order to cause the user 10 to select an authentication location and an authentication time. The authentication location and the authentication time to be transmitted to the information terminals 200c and 200d may be input to the authentication server 300c by the operator 20.

The authentication server 300c compares the authentication location information and the authentication time information from the information terminal 200c, and the authentication location information and the authentication time information from the information terminal 200d (step S2020). In the case where the authentication location information from the information terminal 200c matches the authentication location information from the information terminal 200d and the authentication time information from the information terminal 200c matches the authentication time information from the information terminal 200d, the procedure advances to the next step. In the case where the authentication location information from the information terminal 200c does not match the authentication location information from the information terminal 200d, in the case where the authentication time information from the information terminal 200c does not match the authentication time information from the information terminal 200d, or in the case where neither the authentication location information nor the authentication time information from the information terminal 200c matches the authentication location information or the authentication time information from the information terminal 200d, the authentication server 300c may instruct the information terminals 200c and 200d to display, on the display portions thereof, a request to the users 10 and 10d to input the authentication location and the authentication time again. In the case where the authentication location information from the information terminal 200c does not match the authentication location information from the information terminal 200d, in the case where the authentication time information from the information terminal 200c does not match the authentication time information from the information terminal 200d, or in the case where neither the authentication location information nor the authentication time information from the information terminal 200c matches the authentication location information or the authentication time information from the information terminal 200d, the authentication server 300c may instruct the information terminals 200c and 200d to display a message that the authentication is not successfully made on the display portions thereof.

In the case where the authentication location information from the information terminal 200c matches the authentication location information from the information terminal 200a and the authentication time information from the information terminal 200c matches the authentication time information from the information terminal 200d, the authentication server 300c generates a first ID number corresponding to the authentication location and the authentication time, a second ID number corresponding to the information terminal 200c, and a second ID number corresponding to the information terminal 200d (step S2040). Instead of generating the first ID number and the second ID numbers, the authentication server 300c may acquire the first ID number, the second ID number for the information terminal 200c and the second ID number for the information terminal 200d stored on the storage portion of the authentication server 300c. Alternatively, after the authentication location information from the information terminal 200c matches the authentication location information from the information terminal 200d, and the authentication time information from the information terminal 200c matches the authentication time information from the information terminal 200d, the authentication server 300c may transmit the authentication location information and the authentication time information to the information terminal 400 of the operator 20 and acquire the first ID number, the second ID number for the information terminal 200c and the second ID number for the information terminal 200d transmitted by the operator 20 to the authentication server 300c via the information terminal 400.

The authentication server 300c stores the first ID number transmitted from the information terminal 200c and the second ID number for the information terminal 200c on the storage portion as a pair, and stores the first ID number transmitted from the information terminal 200d and the second ID number for the information terminal 200d on the storage portion as a pair (step S2060). The authentication server 300c may correlate the user ID number of the user 10, the first ID number transmitted from the information terminal 200c and the second ID number for the information terminal 200c to each other, and store the ID numbers in the correlated state on the storage portion. The authentication server 300c may correlate the user ID number of the user 10d, the first ID number transmitted from the information terminal 200d and the second ID number for the information terminal 200d to each other, and store the ID numbers in the correlated state on the storage portion.

Before the authentication reception time, the authentication server 300c transmits the first ID number in the beacon signal transmitted from the information terminal 200c and the second ID number for the information terminal 200c to the information terminal 200d, and transmits the first ID number in the beacon signal transmitted from the information terminal 200d and the second ID number for the information terminal 200d to the information terminal 200c (step S2080).

The authentication server 300c receives the user ID number from the information terminal 200c, the first ID number in the beacon signal received by the information terminal 200c, and the second ID number for the information terminal 200d which transmitted the beacon signal received by the information terminal 200c, and also receives the user ID number from the information terminal 200d, and the first ID number in the beacon signal received by the information terminal 200d, the second ID number for the information terminal 200c which transmitted the beacon signal received by the information terminal 200d (step S2100). The authentication server 300c may receive a biological authentication result from the information terminal 200c within the authentication reception time. In the case where the authentication server 300c receives the biological authentication result, the biological authentication result and a location authentication result to be generated in step S2140 may be correlated to the user ID and stored in the correlated state on the storage portion of the authentication server 300c. Similarly, the authentication server 300c may receive the biological authentication result from the information terminal 200d within the authentication reception time. In the case where the authentication server 300c receives the biological authentication result, the biological authentication, result and the location authentication result to be generated in step S2140 may be correlated to the user ID and stored in the correlated state on the storage portion of the authentication server 300c. Needless to say, the authentication server 300c may receive separately a set of the user ID number from the information terminal 200c and the first ID number in the beacon signal received by the information terminal 200c, a set of the user ID number from the information terminal 200c and the second ID number for the information terminal 200d which transmitted the beacon signal received by the information terminal 200c, a set of the user ID number from the information terminal 200d and the first ID number in the beacon signal received by the information terminal 200d, and a set of the user ID number from the information terminal 200d and the second ID number for the information terminal 200c which transmitted the beacon signal received by the information terminal 200d.

In the case where the authentication server 300c does not receive the biological authentication result from the information terminal 200c within the authentication reception time, the authentication server 300c may instruct the information terminal 200c to display, on the display portion thereof, a request to the user 10 to input the biological information again. Similarly, in the case where the authentication server 300c does not receive the user ID number, the first ID number or the second ID number from the information terminal 200d within the authentication reception time, the authentication server 300c may instruct the information terminal 200d to display, on the display portion thereof, a request to the user 10d to input the biological information again.

The authentication server 300c retrieves the pair of the first ID number and the second ID number stored on the storage portion thereof (step S2120).

The authentication server 300c determines whether or not the pair of the first ID number and the second ID number stored on the storage portion matches the pair of the first ID number and the second ID number received from the information terminal 200c (step S2140). In the case where the pair of the first ID number and the second ID number stored on the storage portion matches the pair of the first ID number and the second ID number received from the information terminal 200c, the authentication server 300c determines that the location authentication of the information terminal 200c is successfully made. The time at which the authentication server 300c made such a determination may be correlated to the user ID number and stored in the correlated state on the storage portion of the authentication server 300c.

The authentication server 300c transmits a comprehensive authentication result, which indicates the results of both of the biological authentication and the location authentication, to the information terminal 200c. In the case where both of the biological authentication and the location authentication are successfully made, the authentication server 300c determines that the comprehensive authentication is successfully made. The authentication server 300c may correlate the comprehensive authentication result in the information terminal 200c to the user ID number and store the comprehensive authentication result in the correlated state on the storage portion of the authentication server 300c.

Similarly, in step S2140, the authentication server 300c determines whether or not the pair of the first ID number and the second ID number stored on the storage portion matches the pair of the first ID number and the second ID number received from the information terminal 200d. In the case where the pair of the first ID number and the second ID number stored on the storage portion matches the pair of the first ID number and the second ID number received from the information terminal 200d, the authentication server 300c determines that the location authentication of the information terminal 200d is successfully made. The time at which the authentication server 300c made such a determination may be correlated to the user ID number and stored in the correlated state on the storage portion of the authentication server 300c.

In step S2080, the authentication server 300c may transmit one of the first ID number and the second ID number to each of the information terminals 200c and 200d, the information terminals 200c and 200d may each recognize the other of the first ID number and the second ID number from the beacon signal based on the ID number transmitted from the authentication server 300c, and the information terminals 200c and 200d may each transmit the other ID number to the authentication server 300c. In step S2100, the authentication server 300c may receive the other ID number. In step S2120, the other of the first ID number and the second ID number stored on the authentication server 300c may be retrieved. In step S2140, the authentication server 300c may determine whether or not the other ID number received matches the other of the first ID number and the second ID number stored on the authentication server 300c.

The authentication server 300c transmits the comprehensive authentication result, which indicates the results of both of the biological authentication and the location authentication, to the information terminal 200c (step S2160). In the case where both of the biological authentication and the location authentication are successfully made, the authentication server 300c determines that the comprehensive authentication is successfully made. The authentication server 300c may correlate the comprehensive authentication result in the information terminal 200c to the user ID number and store the comprehensive authentication result in the correlated state on the storage portion of the authentication server 300c.

Similarly, in step S2160, the authentication server 300c transmits the comprehensive authentication result, which indicates the results of both of the biological authentication and the location authentication, to the information terminal 200*d*. The authentication server 300*c* may correlate the comprehensive authentication result in the information terminal 200*d* to the user ID number and store the comprehensive authentication result in the correlated state on the storage portion of the authentication server 300*c*.

Hereinafter, a user authentication method, a user authentication system and a user authentication application program in embodiment 5 according to the present invention will be described.

Figure 17:
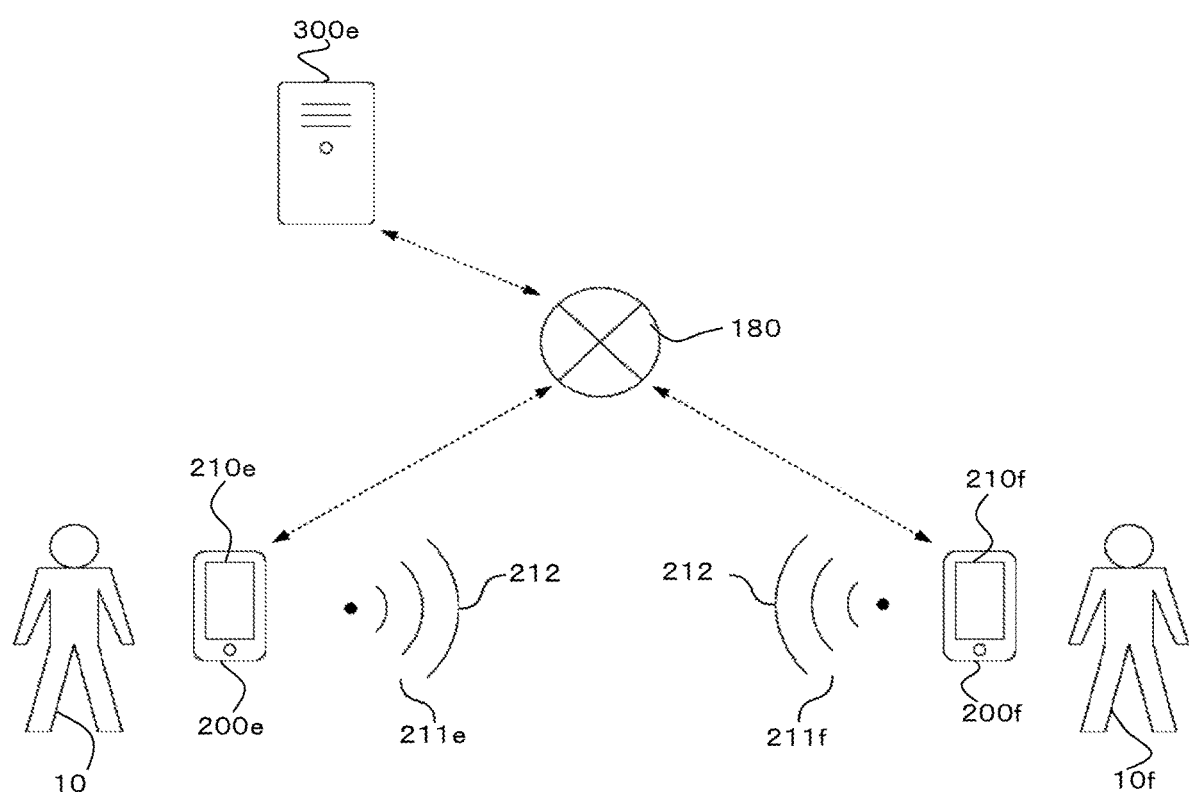
FIG. 17 shows a user authentication method in embodiment 5 according to the present invention.

FIG. 17 shows a user authentication method in embodiment 5 according to the present invention. In embodiment 5, two users perform the location authentication by use of respective information terminals capable of transmitting and receiving a beacon signal and perform the biological authentication by use of an authentication server.

In the user authentication system in embodiment 5, an authentication server 300*e* may perform step S710 through step S770 shown in FIG. 9(*a*) to exchange information with information terminals 200*e* and 200*f*, so that the advance registration before the user authentication may be performed.

Hereinafter, an example of user authentication will be described with reference to FIG. 18. Before the user authentication, the advance registration is performed by the information terminals 200*e* and 200*f*.

Figure 18:
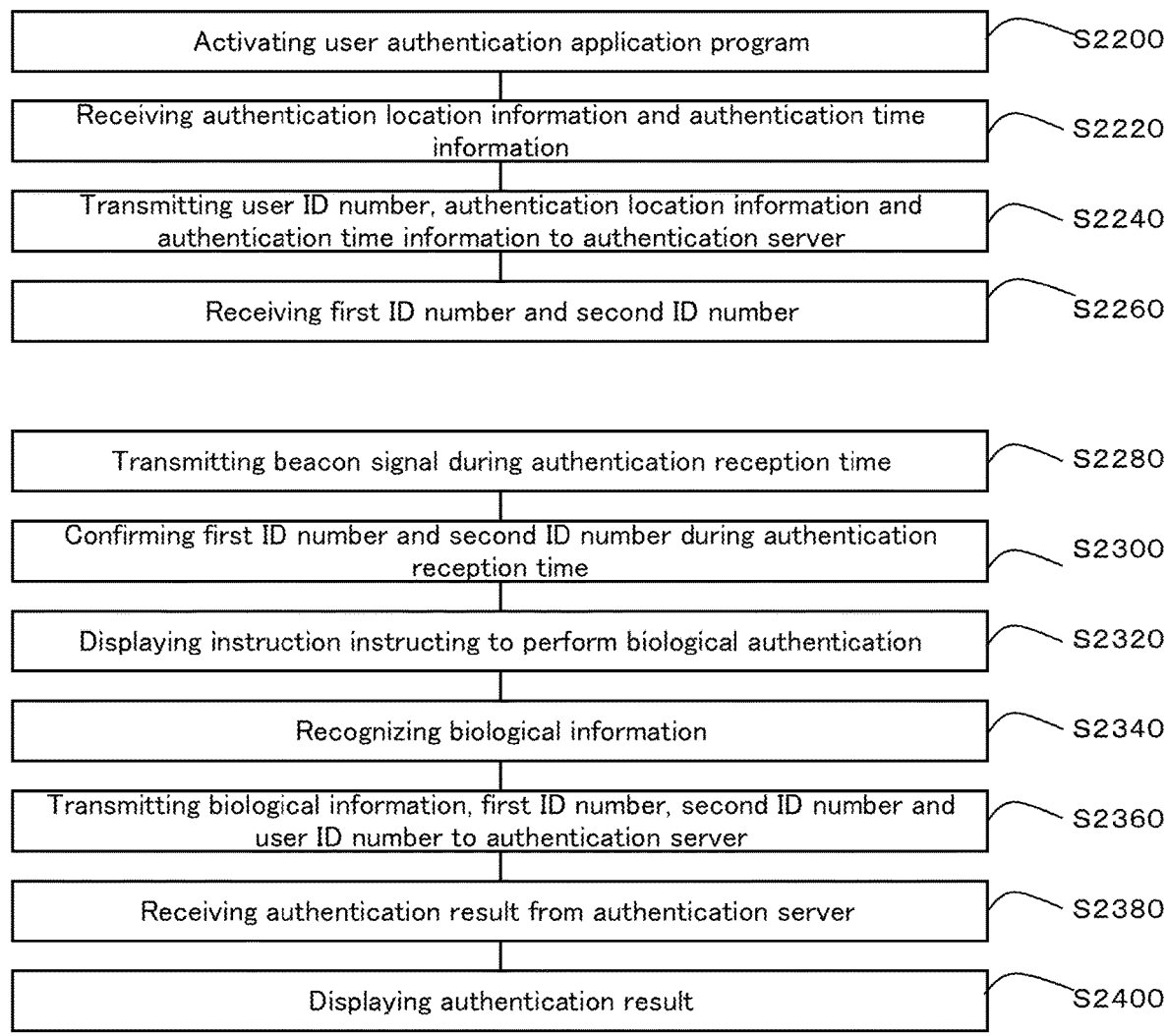
FIG. 18 is a flowchart showing an example of user authentication application program in embodiment 5.

FIG. 18 is a flowchart showing an example of user authentication application program in embodiment 5. Hereinafter, an example of user authentication will be described with reference to FIG. 18. Before the user authentication, the above-described advance registration is performed.

The user 10 operates the information terminal 200*e* to activate the user authentication application program (step S2200). The user authentication application program causes a display portion 210*e* of the information terminal 200*e* to display an instruction instructing the user 10 to input the authentication location and the authentication time. When the user 10 inputs the authentication location and the authentication time to the information terminal 200*e*, the user authentication application program causes the information terminal 200*e* to receive the authentication location information and the authentication time information (step S2220).

The user 10 may input the authentication location and the authentication time by selecting the authentication location and the authentication time displayed on the display portion 210*e* of the information terminal 200*e*, or may directly input numerical values and letters by use of the touch panel or the keys of the information terminal 200*e*. In the case where the user 10 selects the authentication location and the authentication time, the user authentication application program may instruct the information terminal 200*e* to receive the authentication location information and the authentication time information from the authentication server 300*e*.

After the authentication location information and the authentication time information input by the user 10 are received, the user authentication application program instructs the information terminal 200*e* to transmit the user ID number, the authentication location information, and the authentication time information stored on a storage portion of the information terminal 200*e* to the authentication server 300*e* (step S2240).

Similarly, the user authentication application program causes the information terminal 200*f* to perform step S2220 through step S2240. The expression "similarly, . . . perform the steps" indicates that, for example, the steps described as being performed by the "information terminal 200*e*" are also performed by the "information terminal 200*f*", and the steps described as being performed by the "information terminal 200*f*" are also performed by the "information terminal 200*e*", as is obvious to a person of ordinary skill in the art. This is also applicable to the rest of the specification.

The user authentication application program installed on the information terminal 200*e* causes the information terminal 200*e* to receive the first ID number and the second ID number transmitted from the authentication server 300*e* and to store the first ID number and the second ID number on the storage portion of the information terminal 200*e* (step S2260).

Similarly, a user authentication application program installed on the information terminal 200*f* performs step S2220 through step S2260.

At least one of the first ID number and second ID number may be generated by, and stored on, the authentication server 300*e*. At least one of the first ID number and second ID number may be input from outside to the authentication server 300*e* and stored on the authentication server 300*e*. For example, the user authentication application program installed on the information terminal 200*f* may transmit the second ID number regarding the information terminal 200*f* to the authentication server 300*e* in advance, the authentication server 300*e* may store the second ID number regarding the information terminal 200*f*; the authentication server 300*e* may generate and store the first ID number, the user authentication application program installed on the information terminal 200*e* may transmit the second ID number regarding the information terminal 200*e* to the authentication server 300*e* in advance, and the authentication server 300*e* may store the second ID number regarding the information terminal 200*e*.

The information terminals 200*e* and 200*f* respectively transmit beacon signals 211*e* and 211*f*. The beacon signals 211*e* and 211*f* may each include the common first ID number 212. The beacon signal 211*e* may include the second ID number indicating that the beacon signal 211*e* has been transmitted from the information terminal 200*e*. The beacon signal 211*f* may include the second ID number indicating that the beacon signal 211*f* has been transmitted from the information terminal 200*f*.

After causing the information terminal 200*e* to receive the first ID number 212 and the second ID number regarding the information terminal 200*e* and during, or before, the authentication reception time, the user authentication, application program of the information terminal 200*e* causes the information terminal 200*e* to transmit the beacon signal 211*e* including the first ID number 212 and the second ID number regarding the information terminal 200*e* (step S2280). Similarly, after causing the information terminal 200*f* to receive the first ID number 212 and the second ID number regarding the information terminal 200*f* and during, or slightly before, the authentication reception time, the user authentication application program of the information terminal 200*f* causes the information terminal 200*f* to transmit the beacon signal 211*f* including the first ID number 212 and the second ID number regarding the information terminal 200*f* (step S2280).

The user authentication application program of the information terminal 200*e* causes the information terminal 200*e* to be capable of receiving the beacon signal and to confirm the first ID number and the second ID number in the received beacon signal 211*f* (step S2300). Similarly, the user authentication application program of the information terminal 200*f* causes the information terminal 200*f* to perform Step S2300.

After causing the information terminal 200e to confirm the first ID number and the second ID number in the received beacon signal 211f, the user authentication application program of the information terminal 200e causes the display portion 210e of the information terminal 200e to display an instruction instructing the user 10 to perform the biological authentication (step S2320). Similarly, the user authentication application program of the information terminal 200f causes the information terminal 200f to perform step S2320.

The user authentication application program of the information terminal 200e causes the display portion 210e of the information terminal 200e to display an instruction instructing the user 10 to input the biological information. When the user 10 inputs the biological information to the information terminal 200e, the user authentication application program causes the information terminal 200e to recognize the input biological information (step S2340). Similarly, the user authentication application program of the information terminal 200f causes the information terminal 200f to perform step S2340.

The user 10 and a user 10f may voluntarily input the biological information respectively to the information terminals 200e and 200f. In this case, if the information, included in the beacon signal, to be confirmed, for example, the second ID number, is not confirmed, the procedure does not advance to step S2360.

The user authentication application program of the information terminal 200e transmits the biological information recognized by the information terminal 200e, the first ID number, the second ID number and the user ID number of the user 10 to the authentication server 300e (step S2360). Needless to say, a set of the user ID number of the user 10 and the first ID number, a set of the user ID number of the user 10 and the second ID number, and a set of the user ID number of the user 10 and the biological information may be transmitted separately. Similarly, the user authentication application program of the information terminal 200f transmits the recognized biological information and the user ID number of the user 10f to the authentication server 300e, Needless to say, a set of the user ID number of the user 10f and the first ID number, a set of the user ID number of the user 10f and the second ID number, and a set of the user ID number of the user 10f and the biological information may be transmitted separately.

The user authentication application program of the information terminal 200e causes the information terminal 200e to receive the authentication result from the authentication server 300e (step S2380), and causes the display portion 210e of the information terminal 200e to display the authentication result (step S2400). Similarly, the user authentication application program of the information terminal 200f causes the information terminal 200f to perform step S2380 and step S2400.

The confirmation in step S2300 may be performed when the information terminal 200e is located within a range having a distance D from the information terminal 200f. Where the electric field intensity is E when the distance from the information terminal 200f is D, the user authentication application program of the information terminal 200e may cause the information terminal 200e to confirm the first ID number in the received beacon signal when the electric field intensity of the beacon signal 211f is E or greater. Similarly, the user authentication application program of the information terminal 200f may cause the information terminal 200f to confirm the first ID number in the received beacon signal when the electric field intensity of the beacon signal 211e is E or greater.

In the user authentication system in embodiment 5, the authentication server 300e may perform the step S1110 through step S1170 shown in FIG. 10(a) to exchange information with the information terminals 200e and 200f, so that the advance registration before the user authentication may be performed.

Figure 19:
FIG. 19 is a figure showing an example or user authentication.

Hereinafter, an example of user authentication will be described with reference to FIG. 19. Before the user authentication, the advance registration is performed by the information terminals 200e and 200f.

The authentication server 300e receives, from the information terminals 200e and 200f, the authentication location information, the authentication time information, and the user ID number (step S2500). Before receiving the authentication location information and the authentication time information from the information terminals 200e and 200f, the authentication server 300e may transmit at least one piece of authentication location information and at least one piece of authentication time information to the information terminals 200e and 200f in order to cause the user 10 to select an authentication location and an authentication time. The authentication location and the authentication time to be transmitted to the information terminals 200e and 200f may be input to the authentication server 300e by the operator 20.

The authentication server 300e compares the authentication location information and the authentication time information from the information terminal 200e, and the authentication location information and the authentication time information from the information terminal 200f (step S2520). In the case where the authentication location information from the information terminal 200e matches the authentication location information from the information terminal 200f and the authentication time information from the information terminal 200e matches the authentication time information from the information terminal 200f, the procedure advances to the next step. In the case where the authentication location information from the information terminal 200e does not match the authentication location information from the information terminal 200f, in the case where the authentication time information from the information terminal 200e does not match the authentication time information from the information terminal 200f, or in the case where neither the authentication location information nor the authentication time information from the information terminal 200e matches the authentication location information or the authentication time information from the information terminal 200f, the authentication server 300e may instruct the information terminals 200e and 200f to display, on the display portions thereof, a request to the users 10 and 10f to input the authentication location and the authentication time again. In the case where the authentication location information from the information terminal 200e does not match the authentication location information from the information terminal 200f, in the case where the authentication time information from the information terminal 200e does not match the authentication time information from the information terminal 200f, or in the case where neither the authentication location information nor the authentication time information from the information terminal 200e matches the authentication location information or the authentication time information from the information terminal 200f, the authentication server 300e may instruct the information terminals 200e and 200f to display, on the display portions thereof, a message that the authentication is not successfully made.

In the case where the authentication location information from the information terminal 200e matches the authentication location information from the information terminal 200f and the authentication time information from the information terminal 200e matches the authentication time information from the information terminal 200f, the authentication server 300e generates a first ID number corresponding to the authentication location and the authentication time, a second ID number corresponding to the information terminal 200e, and a second ID number corresponding to the information terminal 200f (step S2540). Instead of generating the first ID number and the second ID numbers, the authentication server 300e may acquire the first ID number, the second ID number for the information terminal 200e and the second ID number for the information terminal 200f stored on the storage portion of the authentication server 300e. Alternatively, after the authentication location information from the information terminal 200e matches the authentication location information from the information terminal 200f and the authentication time information from the information terminal 200e matches the authentication time information from the information terminal 200f, the authentication server 300e may transmit the authentication location information and the authentication time information to the information terminal 400 of the operator 20 and acquire the first ID number, the second ID number for the information terminal 200e and the second ID number for the information terminal 200f transmitted by the operator 20 to the authentication server 300e via the information terminal 400.

The authentication server 300e stores the first ID number transmitted from the information terminal 200e and the second ID number for the information terminal 200e on the storage portion as a pair, and stores the first ID number transmitted from the information terminal 200f and the second ID number for the information terminal 200f on the storage portion as a pair (step S2560). The authentication server 300e may correlate the user ID number of the user 10, the first ID number transmitted from the information terminal 200e and the second ID number for the information terminal 200e to each other, and store the ID numbers in the correlated state on the storage portion. The authentication server 300e may correlate the user ID number of the user 10f, the first ID number transmitted from the information terminal 200f and the second ID number for the information terminal 200f to each other, and store the ID numbers in the correlated state on the storage portion.

Before the authentication reception time, the authentication server 300e transmits the first ID number in the beacon signal transmitted from the information terminal 200e and the second ID number for the information terminal 200e to the information terminal 200f, and transmits the first ID number in the beacon signal transmitted from the information terminal 200f and the second ID number for the information terminal 200f to the information terminal 200e (step S2580).

The authentication server 300e receives the user ID number and the biological information from the information terminal 200e, the first ID number in the beacon signal received by the information terminal 200e, and the second ID number for the information terminal 200f which transmitted the beacon signal received by the information terminal 200e, and also receives the user ID number and the biological information from the information terminal 200f, the first ID number in the beacon signal received by the information terminal 200f, and the second ID number for the information terminal 200e which transmitted the beacon signal received by the information terminal 200f (step S2600). Needless to say, a set of the user ID number of the user 10 and the first ID number, a set of the user ID number of the user 10 and the second ID number, a set of the user ID number of the user 10 and the biological information, a set of the user ID number of the user 10f and the first ID number, a set of the user ID number of the user 10f and the second ID number, and a set of the user ID number of the user 10f and the biological information may be received separately.

The authentication server 300e retrieves the pair of the first ID number and the second ID number that corresponds to the user ID number transmitted from the information terminal 200e and is stored on the storage portion thereof (step S2620). Similarly, the authentication server 300e retrieves the pair of the first ID number and the second ID number that corresponds to the user ID number transmitted from the information terminal 200f and is stored on the storage portion thereof (step S2620).

The authentication server 300e determines whether or not the pair of the first ID number and the second ID number that corresponds to the user ID number transmitted from the information terminal 200e and is stored on the storage portion matches the pair of the first ID number and the second ID number received from the information terminal 200e (step S2640). Similarly, the authentication server 300e determines whether or not the pair of the first ID number and the second ID number that corresponds to the user ID number transmitted from the information terminal 200f and is stored on the storage portion matches the pair of the first ID number and the second ID number received from the information terminal 200f (step S2640).

In the case where the pair of the first ID number and the second ID number stored on the storage portion matches the pair of the first ID number and the second ID number received from the information terminal 200e, the authentication server 300e determines that the location authentication of the information terminal 200e is successfully made. The time at which the authentication server 300e made such a determination may be correlated to the user ID number and stored in the correlated state on the storage portion of the authentication server 300e.

The authentication server 300e retrieves the biological information corresponding to the user ID from the information terminal 200e (step S2660). Similarly, the authentication server 300e retrieves the biological information corresponding to the user ID from the information terminal 200f (step S2660).

The authentication server 300e compares the biological information transmitted from the information terminal 200e, and the biological information that corresponds to the user ID number transmitted from the information terminal 200e and is stored on the storage portion of the authentication server 300e, and determines whether or not the two pieces of information match each other (step S2680). Similarly, the authentication server 300e compares the biological information transmitted from the information terminal 200f, and the biological information that corresponds to the user ID number transmitted from the information terminal 200f and is stored on the storage portion of the authentication server 300e, and determines whether or not the two pieces of information match each other (step S2680).

The authentication server 300e transmits a comprehensive authentication result, which indicates the results of both of the biological authentication and the location authentication, to the information terminal 200e (step S2700). In the case where both of the biological authentication and the location authentication are successfully made, the authentication server 300e determines that the comprehensive authentication is successfully made. The authentication server 300e may correlate the comprehensive authentication result in the information terminal 200e to the user ID number and store the comprehensive authentication result in the correlated state on the storage portion of the authentication server 300e.

Similarly, in step S2640, the authentication server 300e determines whether or not the pair of the first ID number and the second ID number stored on the storage portion matches the pair of the first ID number and the second ID number received from the information terminal 200f. In the case where the pair of the first ID number and the second ID number stored on the storage portion matches the pair of the first ID number and the second ID number received from the information terminal 200f, the authentication server 300e determines that the location authentication of the information terminal 200f is successfully made. The time at which the authentication server 300e made such a determination may be correlated to the user ID number and stored in the correlated state on the storage portion of the authentication server 300e.

In step S2580, the authentication server 300e may transmit one of the first ID number and the second ID number to each of the information terminals 200e and 200f, the information terminals 200e and 200f may each recognize the other of the first ID number and the second ID number from the beacon signal based on the ID number transmitted from the authentication server 300e, and the information terminals 200e and 200f may each transmit the other ID number to the authentication server 300e. In step S2600, the authentication server 300e may receive the other ID number. In step S2620, the other of the first ID number and the second ID number stored on the authentication server 300e may be retrieved. In step S2640, the authentication server 300e may determine whether or not the other ID number received matches the other of the first ID number and the second ID number stored on the authentication server 300e.

The authentication server 300e transmits the comprehensive authentication result, which indicates the results of both of the biological authentication and the location authentication, to the information terminal 200e (step S2700). In the case where both of the biological authentication and the location authentication are successfully made, the authentication server 300e determines that the comprehensive authentication is successfully made. The authentication server 300e may correlate the comprehensive authentication result in the information terminal 200e to the user ID number and store the comprehensive authentication result in the correlated state on the storage portion of the authentication server 300e.

Similarly, in step S2700, the authentication server 300e transmits the comprehensive authentication result, which indicates the results of both of the biological authentication and the location authentication, to the information terminal 200f. The authentication server 300e may correlate the comprehensive authentication result in the information terminal 200f to the user ID number and store the comprehensive authentication result in the correlated state on the storage portion of the authentication server 300e.

The determination in step S2680 may be performed as follows. The recognized biological information and the biological information stored on the storage portion of the authentication server 300e are sampled, and a total value of matching points out of the sampling points is found. In the case where the total value is higher than, or equal, to the threshold value X, the user authentication application program may determine that the two pieces of biological information match each other. In the case where the total value is lower than the threshold value X, the user authentication application program may determine that the two pieces of biological information do not match each other.

Hereinafter, a user authentication method, a user authentication system and a user authentication application program in embodiment 6 according to the present invention will be described.

Figure 20:
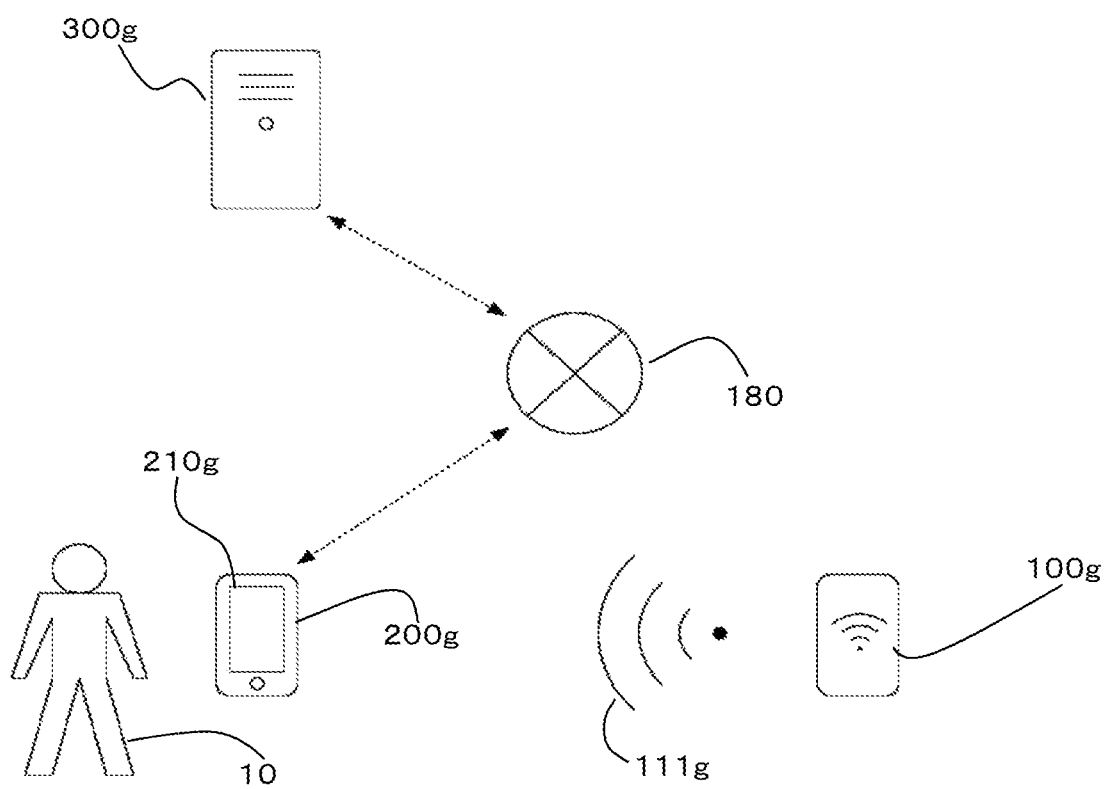
FIG. 20 shows a user authentication method in embodiment 6 according to the present invention.

FIG. 20 shows a user authentication method in embodiment 6 according to the present invention. The user 10 registers his/her biological information in an information terminal 200g in advance. The user 10 moves to the authentication location during the authentication reception time together with the information terminal 200g. The user 10 performs the biological authentication while the information terminal 200g is receiving a beacon signal 111g output by an output device 100g located at the authentication location. Thus, it is authenticated that the user who has made an advance registration was at the authentication location during the authentication reception time.

Figure 21:
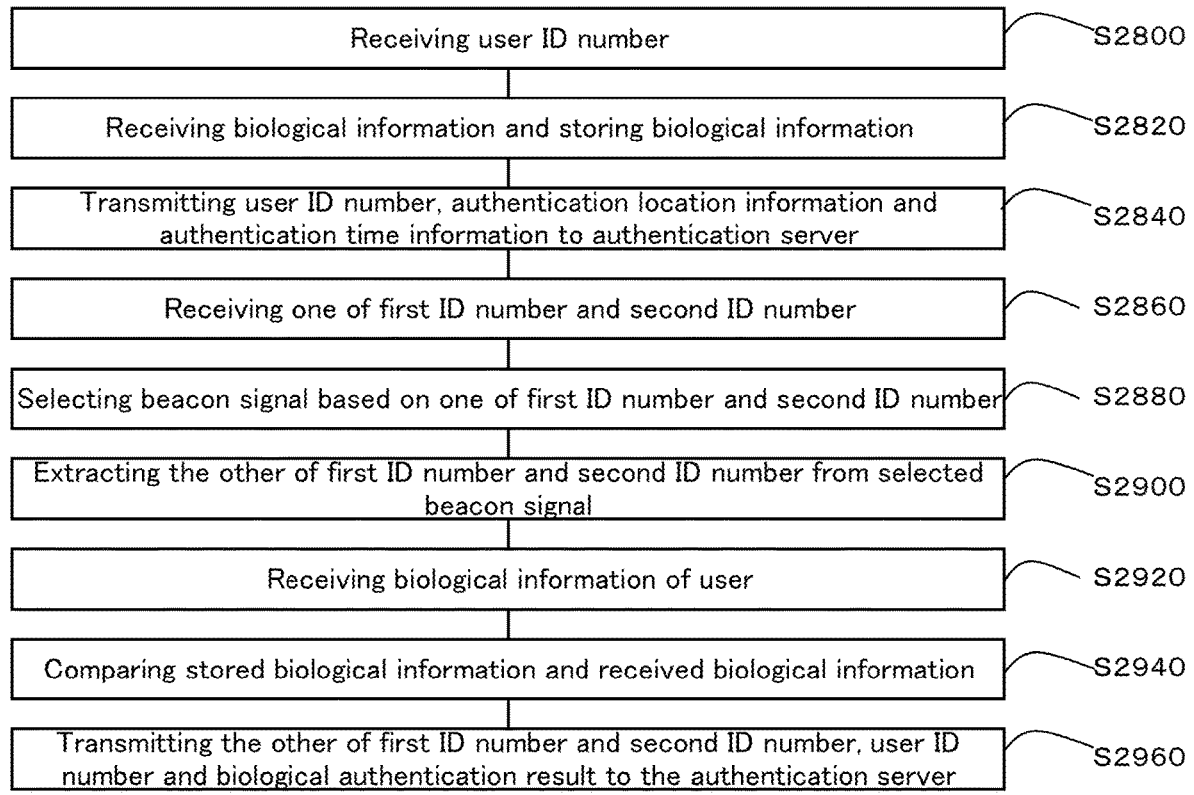
FIG. 21 is a flowchart showing an example of user authentication application program in embodiment 6.

FIG. 21 is a flowchart showing an example of user authentication application program in embodiment 6. Hereinafter, an example of user authentication will be described with reference to FIG. 20.

The user 10 uses the information terminal 200g to access an authentication server 300g. The user authentication application program causes the information terminal 200g to receive the user ID number from the authentication server 300g (step S2800). The user authentication application program causes the information terminal 200g to store the user ID number on a storage portion of the information terminal 200g.

The user 10 inputs his/her biological information to the information terminal 200g. The user authentication application program causes the information terminal 200g to receive the biological information and to store the biological information on the storage portion of the information terminal 200g (step S2820). The information terminal 200g may transmit, to the authentication server 300g, information that the biological information has been stored.

The user authentication application program causes the information terminal 200g to transmit, to the authentication server, the user ID number, authentication location information including information on the authentication location, and authentication time information including information on the authentication time (step S2840). Thus, the user 10 may inform the authentication server of the authentication location and the authentication time.

The user authentication application program may cause the information terminal 200g to receive the authentication location information and the authentication time information from the authentication server 300g. Thus, the user 10 may learn the authentication location and the authentication time.

The user authentication application program may cause the information terminal 200g to receive at least one piece of authentication location information and at least one piece of authentication time information from the authentication server 300g, and then to display the at least one piece of authentication location information and the at least one piece of authentication time information on a display portion 210g. The user 10 may select one piece of authentication location information and one piece of authentication time information, and the user authentication application program may cause the information terminal 200g to transmit, to the authentication server, the selected authentication location information and the selected authentication time information together with the user ID number.

The user authentication application program causes the information terminal 200g to receive one of a first ID number and a second ID number included in the beacon signal output at the authentication location at the authentication time (step S2860). The beacon signal includes the first ID number usable to specify the beacon signal and the second ID number usable to specify the output device 100g outputting the beacon signal. The information terminal 200g may specify one beacon signal from a plurality of beacon signals based on the first ID number or the second ID number included in each of the beacon signals.

The user authentication application program causes the information terminal 200g to be capable of receiving the beacon signal during the authentication reception time. When the user 10 arrives at the authentication location at the authentication time together with the information terminal 200g, the user authentication application program causes the information terminal 200g to select a beacon signal based on one of the first ID number and the second ID number during the authentication reception time (step S2880).

The user authentication application program causes the information terminal 200g to extract the other of the first ID number and the second ID number from the selected beacon signal (step S2900). Unless being at the authentication location during the authentication reception time, the user 10 and the information terminal 200g do not learn the other of the first ID number and the second ID number. The user authentication application program allows the location authentication to be performed by use of the information on such other ID number.

When the information terminal 200g receives the beacon signal, the user authentication application program causes the information terminal 200g to be capable of reading the biological information. For example, the user authentication application program may cause the display portion 210g to provide display urging input of the biological information. Alternatively, the user authentication application program may vibrate the information terminal 200g to urge input of the biological information.

The user 10 inputs the biological information to the information terminal 200g, and thus the user authentication application program may cause the information terminal 200g to receive the biological information (step S2920).

The user authentication application program causes the information terminal 200g to compare the biological information stored on the storage of the information terminal 200g (biological information registered in advance), and the received biological information (biological information received during the authentication reception time) (step S2940). In the case where the number of matching points exceeds a predetermined number as a result of the comparison, the user authentication application program determines that the two pieces of biological information match each other. Namely, the user authentication application program generates a biological authentication result indicating that the two pieces of biological information match each other or do not match each other.

The user authentication application program causes the information terminal 200g to transmit, to the authentication server 300g, the other of the first ID number and the second ID number, the user ID number, and the biological authentication result (step S2960). Then, the authentication server 300g may perform the location authentication, and the information terminal 200g may receive a comprehensive authentication result, which indicates the results of both of the location authentication and the biological authentication. Needless to say, the information terminal 200g may transmit a set of the user ID number and the other ID number, and a set of the user ID number and the biological authentication result, separately.

In step S2960, the user authentication application program transmits the biological authentication result to the authentication server 300g. Alternatively, the user authentication application program may receive a location authentication result from the authentication server 300g and generate the comprehensive authentication result, instead of transmitting the comprehensive authentication result to the authentication server 300g.

Figure 22:
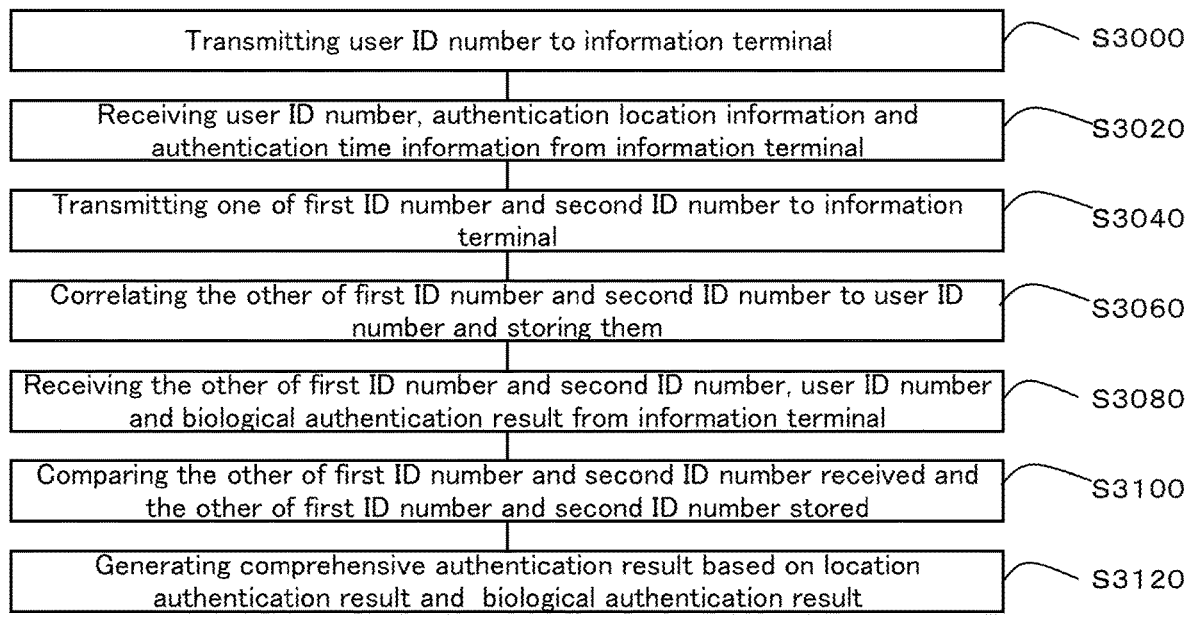
FIG. 22 is a flowchart showing an example of user authentication system.

FIG. 22 is a flowchart showing an example of user authentication system.

The authentication server 300g transmits the user ID number to the information terminal 200g (step S3000). Before transmitting the user ID number, the authentication server 300g may receive a signal requesting for the user ID number from the information terminal 200g.

The authentication server 300g receives, from the information terminal 200g, the user ID number, the authentication location information and the authentication time information (step S3020). Thus, the authentication server 300g may learn the authentication location and the authentication time, and an operator of the authentication server 300g or a person setting the output device 100g may learn the location at which the output device 100g is to be set and the time at which the beacon signal 111g is to be output from the output device 100g.

The authentication server 300g may transmit the authentication location information and the authentication time information to the information terminal 200g. Thus, the user 10 may learn the authentication location and the authentication time.

The authentication server 300g may once transmit, to the information terminal 200g, at least one piece of authentication location information and at least one piece of authentication time information. The user 10 may select one piece of authentication location information and one piece of authentication time information. The authentication server 300g may receive the selected authentication location information and the selected authentication time information together with the user ID number.

The authentication server 300g transmits one of the first ID number and the second ID number included in the beacon signal that is output at the authentication location at the authentication time (step S3040). Based on the first ID number or the second ID number, one beacon signal may be specified from the plurality of beacon signals.

The authentication server 300g correlates the other of the first ID number and the second ID number to the user ID number and stores the other ID number in the correlated state on the storage portion thereof (step S3060). Then, the other ID number is usable for the location authentication.

The authentication server 300g receives, from the information terminal 200g, the other of the first ID number and the second ID number, the user ID number, and the biological authentication result (step S3080). During the authentication reception time, the authentication server 300g may receive the other of the first ID number and the second ID number, the user ID number, and the biological authentication result from the information terminal 200g. Needless to say, the information terminal 200g may receive separately a set of the user ID number and the other ID number, and a set of the user ID number and the biological authentication result.

In order to perform the location authentication, the authentication server 300g compares the other of the first ID number and the second ID number received, and the other of the first ID number and the second ID number that are stored on the storage portion and correspond to the other ID number received (step S3100). In the case where the other ID number received (first ID number or second ID number) matches the other ID number stored on the storage portion (first ID number or second ID number) as a result of the comparison, the authentication server 300g determines that the location is correct. Namely, the authentication server 300g generates the location authentication result indicating that the location is correct or incorrect.

The authentication server 300g generates the comprehensive authentication result based on the location authentication result and the biological authentication result (step S3120). The authentication server 300g may transmit the comprehensive authentication result to the information terminal 200g.

Hereinafter, a user authentication method, a user authentication system and a user authentication application program in embodiment 7 according to the present invention will be described. In embodiment 6, the information terminal performs the biological authentication. In embodiment 7, the authentication server performs the biological authentication. In general, an authentication server has a higher information processing capability than an information terminal. Therefore, in embodiment 7, the authentication is performed in a shorter time than in embodiment 6. In embodiment 7, the biological information stored on the information terminal is not falsified by a user.

Figure 23:
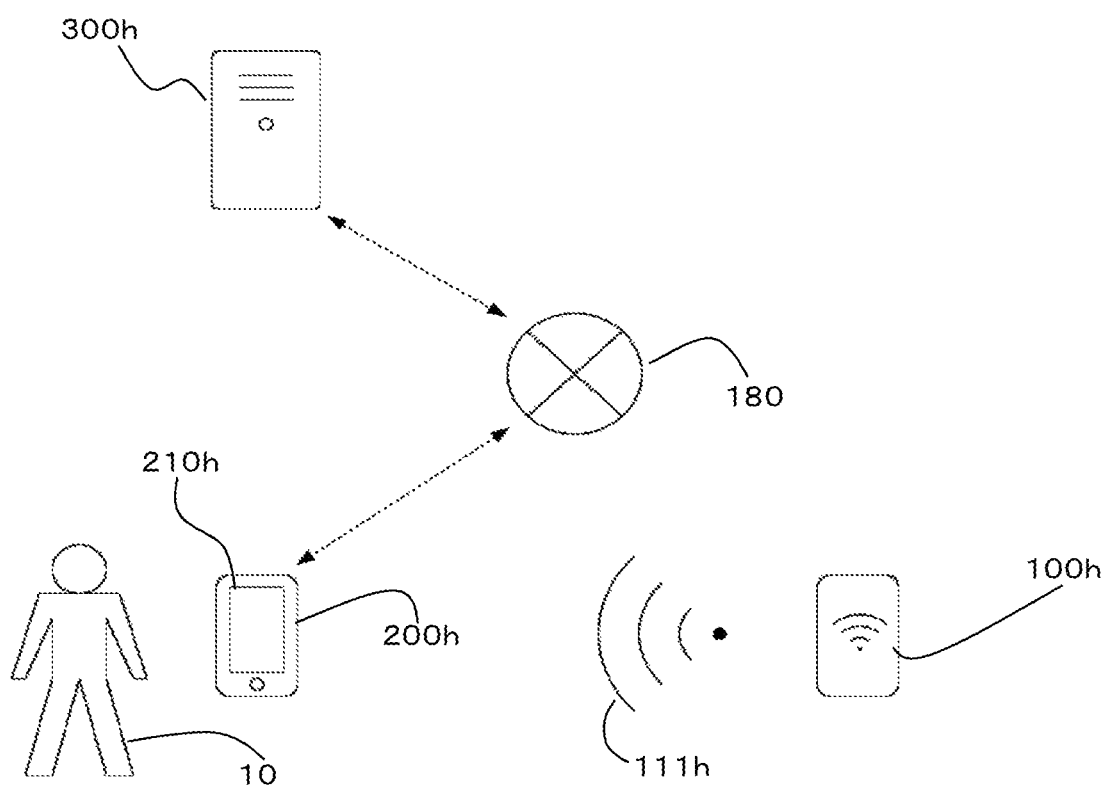
FIG. 23 shows a user authentication method in embodiment 7 according to the present invention.

FIG. 23 shows a user authentication method in embodiment 7 according to the present invention. The user 10 registers his/her biological information in an authentication server 300h via an information terminal 200h in advance. The user 10 moves to the authentication location during the authentication reception time together with the information terminal 200h. The user 10 performs the biological authentication while the information terminal 200h is receiving a beacon signal 111h output by an output device 100h located at the authentication location. Thus, it is authenticated that the user who has made an advance registration was at the authentication location during the authentication reception time.

Figure 24:
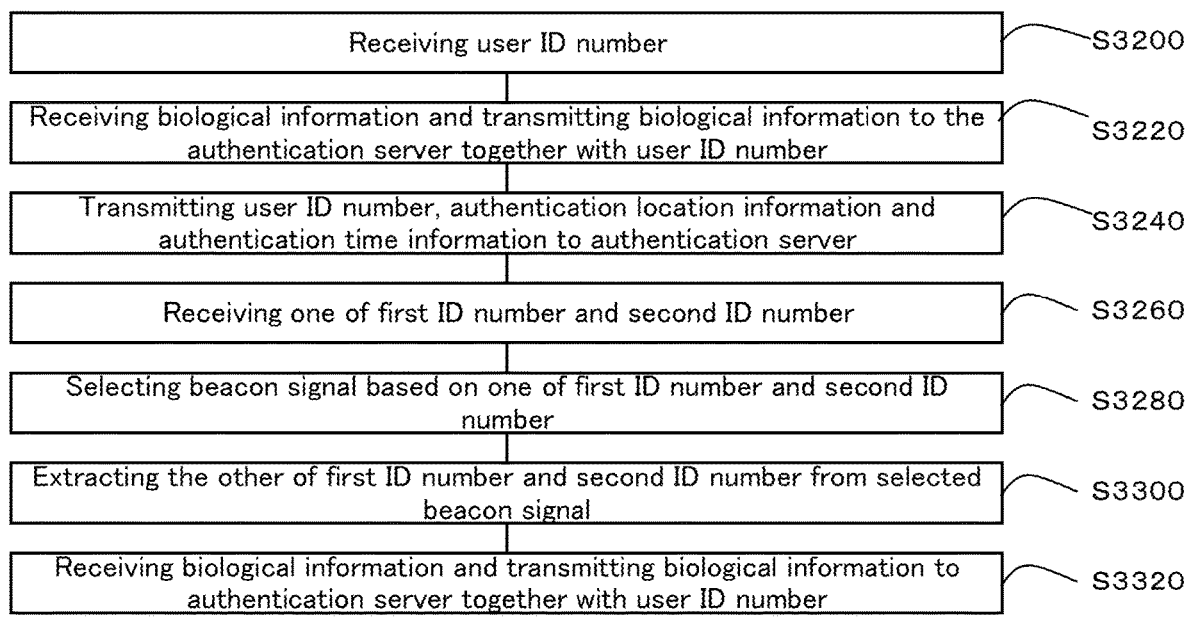
FIG. 24 is a flowchart showing an example of user authentication application program in embodiment 7.

FIG. 24 is a flowchart showing an example of user authentication application program in embodiment 7. Hereinafter, an example of user authentication will be described with reference to FIG. 24.

The user 10 uses the information terminal 200h to access the authentication server 300h. The user authentication application program causes the information terminal 200h to receive the user ID number from the authentication server 300h (step S3200). The user authentication application program causes the information terminal 200h to store the user ID number on a storage portion of the information terminal 200h.

The user 10 inputs his/her biological information in the information terminal 200h. The user authentication application program causes the information terminal 200h to receive the biological information and to transmit the biological information to the authentication server 300h (step S3220).

The user authentication application program causes the information terminal 200h to transmit, to the authentication server, the user ID number, authentication location information including information on the authentication location, and authentication time information including information on the authentication time (step S3240). Thus, the user 10 may inform the authentication server of the authentication location and the authentication time.

The user authentication application program may cause the information terminal 200h to receive the authentication location information and the authentication time information from the authentication server 300h. Thus, the user 10 may learn the authentication location and the authentication time.

The user authentication application program may cause the information terminal 200h to receive at least one piece of authentication location information and at least one piece of authentication time information from the authentication server 300h, and then to display the at least one piece of authentication location information and the at least one piece of authentication time information on a display portion 210h. The user 10 may select one piece of authentication location information and one piece of authentication time information, and the user authentication application program may cause the information terminal 200h to transmit, to the authentication server, the selected authentication location information and the selected authentication time information together with the user ID number.

The user authentication application program causes the information terminal 200h to receive one of a first ID number and a second ID number included in the beacon signal output at the authentication location at the authentication time (step S3260).

The user authentication application program causes the information terminal 200h to be capable of receiving the beacon signal during the authentication reception time. When the user 10 arrives at the authentication location at the authentication time together with the information terminal 200h, the user authentication application program causes the information terminal 200h to select a beacon signal based on one of the first ID number and the second ID number during the authentication reception time (step S3280).

The user authentication application program causes the information terminal 200h to extract the other of the first ID number and the second ID number from the selected beacon signal (step S3300).

When the information terminal 200h receives the beacon signal, the user authentication application program causes the information terminal 200h to be capable of reading the biological information. For example, the user authentication application program may cause the display portion 210h to provide display urging input of the biological information. Alternatively, the user authentication application program may vibrate the information terminal 200h to urge input the biological information.

The user 10 inputs the biological information to the information terminal 200h, and thus the user authentication application program may cause the information terminal 200h to receive the biological information and to transmit the biological information to the authentication server 300h together with the user ID number (step S3320).

After step S3300, the user authentication application program causes the information terminal 200h to transmit the other of the first ID number and the second ID number to the authentication server 300h together with the user ID number.

After step S3320, the authentication server 300h may perform the location authentication, and the information terminal 200h may receive a comprehensive authentication result indicating the results of both of the location authentication and the biological authentication.

Figure 25:
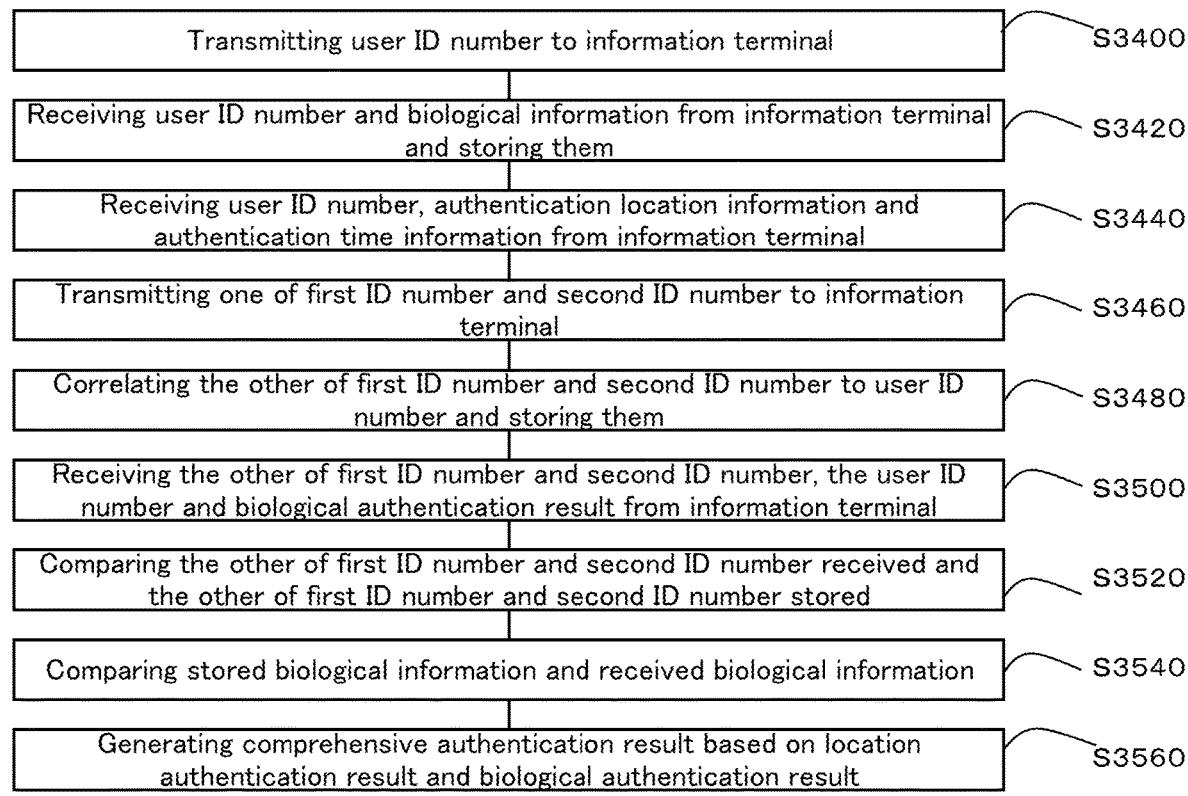
FIG. 25 is a flowchart showing an example of user authentication system.

FIG. 25 is a flowchart showing an example of user authentication system.

The authentication server 300h transmits the user ID number to the information terminal 200h (step S3400).

Before transmitting the user ID number, the authentication server 300h may receive a signal requesting for the user ID number from the information terminal 200h.

The authentication server 300h receives the user ID number and the biological information from the information terminal 200h, correlates the biological information to the user ID number, and stores the biological information in the correlated state on a storage portion of the authentication server 300h (step S3420).

The authentication server 300h receives the user ID number, the authentication location information, and the authentication time information from the information terminal 200h (step S3440). Thus, the authentication server 300h may learn the authentication location and the authentication time, and an operator of the authentication server 300h or a person setting the output device 100h may learn the location at which the output device 100h is to be set and the time at which the beacon signal 111h is to be output from the output device 100h.

The authentication server 300h may transmit the authentication location information and the authentication time information to the information terminal 200h.

The authentication server 300h may once transmit, to the information terminal 200h, at least one piece of authentication location information and at least one piece of authentication time information. The user 10 may select one piece of authentication location information and one piece of authentication time information. The authentication server 300h may receive the selected authentication location information and the selected authentication time information together with the user ID number.

The authentication server 300h transmits one of the first ID number and the second ID number included in the beacon signal that is output at the authentication location at the authentication time (step S3460).

The authentication server 300h correlates the other of the first ID number and the second ID number to the user ID number and stores the other ID number in the correlated state on the storage portion thereof (step S3480).

The authentication server 300h receives, from the information terminal 200h, the other of the first ID number and the second ID number, the user ID number, and the biological information (step S3500). During the authentication reception time, the authentication server 300h may receive the other of the first ID number and the second ID number, the user ID number, and the biological information from the information terminal 200h. Needless to say, the authentication server 300h may receive separately a set of the user ID number and the other ID number and a set of the user ID number and the biological information.

In order to perform the location authentication, the authentication server 300h compares the other of the first ID number and the second ID number received, and the other of the first ID number and the second ID number that are stored on the storage portion and correspond to the received other ID number (step S3520). In the case where the other ID number received (first ID number or second ID number) matches the other ID number stored on the storage portion (first ID number or second ID number) as a result of the comparison, the authentication server 300h determines that the location is correct. Namely, the authentication server 300h generates a location authentication result indicating that the location is correct or incorrect.

The authentication server 300h compares the biological information stored on the storage of the authentication server 300h (biological information registered in advance), and the received biological information (biological information received during the authentication reception time) (step S3540). In the case where the number of matching points exceeds a predetermined number as a result of the comparison, the authentication server 300h determines that the two pieces of biological information match each other. Namely, the authentication server 300h generates a biological authentication result indicating that the two pieces of biological information match each other or do not match each other.

The authentication server 300h generates the comprehensive authentication result based on the location authentication result and the biological authentication result (step S3560). The authentication server 300h may transmit the comprehensive authentication result to the information terminal 200h.

In embodiments 1 through 7, the first ID number may be a beacon signal ID number, and the second ID number may be an output device ID number.

In embodiments 1 through 7, the first ID number and the second ID number may be generated by the authentication server. In the case where the second ID number may be an output device ID number, the Information terminal may transmit an output terminal ID number of its own to the authentication server at the time of the advance registration, and the authentication server may store the output device ID number. In this case, the authentication server may generate and store the first ID number.

In embodiments 1 through 7, in the case where the authentication server cannot perform the location authentication based on the information included in the beacon signal, the authentication server does not need to perform the biological authentication. By contrast, in the case where the authentication server cannot perform the biological authentication, the authentication server does not need to perform the location authentication. A case where the location authentication cannot be performed includes, for example, a case where the ID numbers of the beacon signals do not match each other, and a case where the authentication server cannot receive the ID number, in the beacon signal, that is to be subjected to comparison. A case where the biological authentication cannot be performed includes a case where the pieces of biological information do not match each other, and a case where the authentication server cannot receive the biological information to be subjected to comparison.

For example, the beacon signal may include the first ID number and the second ID number. The user authentication application program according to the present invention is executable by the information terminal. Such a user authentication application program includes a step of receiving the first ID number included in the beacon signal that is output at the authentication location at the authentication time, a step of selecting a beacon signal based on the first ID number during the authentication reception time, a step of extracting the second ID number from the selected beacon signal, and a step of transmitting the second ID number, the user ID number and the biological authentication result to the authentication server. For example, the user authentication system according to the present invention may transmit, to the information terminal, the first ID number included in the beacon signal that is output at the authentication location at the authentication time, may correlate the second ID number to the user ID number and store the second ID number in the correlated state on the storage portion, and may compare the second ID number detected by the information terminal, and the second ID number that is stored on the storage portion and corresponds to the received user ID number.

INDUSTRIAL APPLICABILITY

The user uses an information terminal having a user authentication application program according to the present invention installed thereon and also uses a user authentication system according to the present invention via the user authentication application program, so that it is authenticated that the user who has registered, in advance, his/her biological information in at least one of the information terminal and an authentication server is/was present at the authentication location during the authentication reception time. Specifically, the user who has registered, in advance, his/her biological information in at least one of the information terminal and an authentication server inputs the biological information to the information terminal at the authentication location during the authentication reception time, so that it is authenticated the user who has registered the biological information in advance is/was present at the authentication location during the authentication reception time.

DESCRIPTION OF THE REFERENCE SIGNS

10 User
20 Operate
100 Output device
111 Beacon signal
200 Information terminal
210 Display portion
300 Authentication server
400 Information terminal
410 Display portion

The invention claimed is:

1. A user authentication method comprising:
selecting, by an information terminal, during an authentication reception time, a beacon signal based on one of a first ID number and a second ID number included in a beacon signal output at an authentication location at an authentication time which is received from an authentication server;
extracting, by the information terminal, the other of the first ID number and the second ID number from the selected beacon signal;
receiving, by the information terminal, biological information of a user from outside the information terminal;
comparing, by the information terminal, biological information stored on a storage portion of the information terminal, and the received biological information; and
transmitting, by the information terminal, to the authentication server, the other of the first ID number and the second ID number, a user ID number, and a biological authentication result.

2. A user authentication system comprising an authentication server, the user authentication system being configured to:
correlate, by the authentication server, one of a first ID number and a second ID number included in a beacon signal output at an authentication location at an authentication time, to a user ID number and store, by the authentication server, the one of the first ID number and the second ID number in a correlated state on a storage portion of the authentication server;
receive, by the authentication server, from an information terminal which receives the other of the first ID number and the second ID number, one of the first ID number and the second ID number, the user ID number, and a biological authentication result;
compare, by the authentication server, the one of the first ID number and the second ID number received from the information terminal, and the one of the first ID number and the second ID number stored on the storage portion and corresponding to the user ID number received from the information terminal; and
generate, by the authentication server, a comprehensive authentication result based on a result of the comparison and the biological authentication result.

3. A user authentication method comprising:
selecting, by an information terminal, during an authentication reception time, a beacon signal based on one of a first ID number and a second ID number included in a beacon signal output at an authentication location at an authentication time which is received from an authentication server;
extracting, by the information terminal, the other of the first ID number and the second ID number from the selected beacon signal;
receiving, by the information terminal, biological information of a user during the authentication reception time and transmitting, by the information terminal, the biological information to the authentication server together with a user ID number; and
transmitting, by the information terminal, to the authentication server, the other of the first ID number and the second ID number, and the user ID number.

4. A user authentication system comprising an authentication server, the user authentication system being configured to:
correlate, by the authentication server, one of a first ID number and a second ID number included in a beacon signal output at an authentication location at an authentication time, to a user ID number and store, by the authentication server, the one of the first ID number and the second ID number in a correlated state on a storage portion of the authentication server;
receive, by the authentication server, from an information terminal which receives the other of the first ID number and the second ID number, one of the first ID number and the second ID number, a user ID number, and biological information during an authentication reception time;
compare, by the authentication server, the one of the first ID number and the second ID number received from the information terminal, and the one of the first ID number and the second ID number stored on the storage portion and corresponding to the user ID number received from the information terminal;
compare, by the authentication server, the biological information received during the authentication reception time, and biological information stored on the storage portion and corresponding to the user ID number received from the information terminal; and
generate, by the authentication server, a comprehensive authentication result based on results of the two comparisons.

5. The user authentication application method to claim 1, further comprising:

transmitting, by the information terminal, a third ID number regarding the information terminal to the authentication server; and transmitting, by the information terminal, during the authentication reception time, a beacon signal including the one of the first ID number and the second ID number and the third ID number.

6. The user authentication system according to claim 2, wherein:

before the one of the first ID number and the second ID number is transmitted to the information terminal, the one of the first ID number and the second ID number is stored on the storage portion; and before the other of the first ID number and the second ID number is stored on the storage portion, the other of the first ID number and the second ID number transmitted from another information terminal is received by the authentication terminal.

7. The user authentication method according to claim 3, further comprising:

transmitting, by the information terminal, a third ID number regarding the information terminal to the authentication server; and transmitting by the information terminal, during the authentication reception time, a beacon signal including the one of the first ID number and the second ID number and the third ID number.

8. The user authentication system according to claim 4, wherein:

before the one of the first ID number and the second ID number is transmitted to the information terminal, the one of the first ID number and the second ID number is stored on the storage portion; and before the other of the first ID number and the second ID number is stored on the storage portion, the other of the first ID number and the second ID number transmitted from another information terminal is received by the authentication server.

\* \* \* \* \*